US012626926B2

(12) United States Patent
Wang et al.

(10) Patent No.: US 12,626,926 B2
(45) Date of Patent: May 12, 2026

(54) ELECTRODE WITH FLAME RETARDANT ADDITIVES AND METHOD AND SYSTEMS FOR PREPARATION AND USE

(71) Applicant: A123 Systems LLC, Novi, MI (US)

(72) Inventors: Lixin Wang, Belmont, MA (US); Weidong Zhou, Winchester, MA (US); Yao Chen, Hangzhou (CN); Chloe Harrison, Billerica, MA (US); Fu Zhou, Sichuan (CN); Kitae Kim, Cambridge, MA (US); Jun Wang, Shrewbury, MA (US); Derek C. Johnson, Fort Collins, CO (US)

(73) Assignee: A123 SYSTEMS LLC, Novi, MI (US)

( * ) Notice: Subject to any disclaimer, the term of this patent is extended or adjusted under 35 U.S.C. 154(b) by 1118 days.

(21) Appl. No.: 17/286,430

(22) PCT Filed: Oct. 11, 2019

(86) PCT No.: PCT/US2019/055997
§ 371 (c)(1),
(2) Date: Apr. 16, 2021

(87) PCT Pub. No.: WO2020/086310
PCT Pub. Date: Apr. 30, 2020

(65) Prior Publication Data
US 2021/0391578 A1 Dec. 16, 2021

Related U.S. Application Data

(60) Provisional application No. 62/749,042, filed on Oct. 22, 2018.

(51) Int. Cl.
*H01M 10/05* (2010.01)
*C01F 7/02* (2022.01)
(Continued)

(52) U.S. Cl.
CPC ................ *H01M 4/62* (2013.01); *C01F 7/02* (2013.01); *C01G 53/42* (2013.01); *H01M 4/485* (2013.01);
(Continued)

(58) Field of Classification Search
None
See application file for complete search history.

(56) References Cited

U.S. PATENT DOCUMENTS

| | | |
|---|---|---|
| 7,666,551 B2 | 2/2010 | Kogetsu et al. |
| 2005/0208380 A1 | 9/2005 | Park et al. |

(Continued)

FOREIGN PATENT DOCUMENTS

| | | |
|---|---|---|
| KR | 20160044968 A | 4/2016 |

OTHER PUBLICATIONS

ISA Korean Intellectual Property Office, International Search Report and Written Opinion Issued in Application No. PCT/US2019/055997, Jan. 31, 2020, WIPO, 11 pages.

*Primary Examiner* — Barbara L Gilliam
*Assistant Examiner* — Angela J Martin
(74) *Attorney, Agent, or Firm* — McCoy Russell LLP

(57) ABSTRACT

Methods and systems are provided for an electrode active material for lithium ion batteries. In one example, the electrode active material may include a lithium mixed metal oxide core and flame-retardant dusting particles partially retained within a surface of the core. In some examples, the dusting particles may have an average size of less than 20 μm. In some examples, the amount of dusting particles by weight may be greater than 0.1% of the core particles and less than 50% of the core particles. In another example, methods are provided for manufacturing the electrode active material for use in a lithium ion battery, where lithium metal (Continued)

composite core particles may be mixed with the flame-retardant dusting particles in a dry process.

18 Claims, 15 Drawing Sheets

(51) Int. Cl.

| | |
|---|---|
| *C01G 53/42* | (2025.01) |
| *H01M 4/13* | (2010.01) |
| *H01M 4/48* | (2010.01) |
| *H01M 4/485* | (2010.01) |
| *H01M 4/50* | (2010.01) |
| *H01M 4/52* | (2010.01) |
| *H01M 4/62* | (2006.01) |
| *H01M 10/0525* | (2010.01) |
| *H01M 4/02* | (2006.01) |
| *H01M 4/134* | (2010.01) |

| | |
|---|---|
| *H01M 4/505* | (2010.01) |
| *H01M 4/525* | (2010.01) |

(52) U.S. Cl.
CPC ..... *H01M 10/0525* (2013.01); *C01P 2002/72* (2013.01); *C01P 2002/85* (2013.01); *C01P 2004/03* (2013.01); *H01M 2004/021* (2013.01); *H01M 2004/027* (2013.01); *H01M 2004/028* (2013.01); *H01M 4/134* (2013.01); *H01M 4/505* (2013.01); *H01M 4/525* (2013.01)

(56) References Cited

U.S. PATENT DOCUMENTS

| | | | | |
|---|---|---|---|---|
| 2010/0159314 | A1 | 6/2010 | Kim et al. | |
| 2015/0079473 | A1* | 3/2015 | Kang | .................. H01M 4/1391 |
| | | | | 429/223 |
| 2017/0040600 | A1 | 2/2017 | Nakayama et al. | |
| 2017/0358794 | A1* | 12/2017 | Lee | ....................... H01M 4/525 |

* cited by examiner

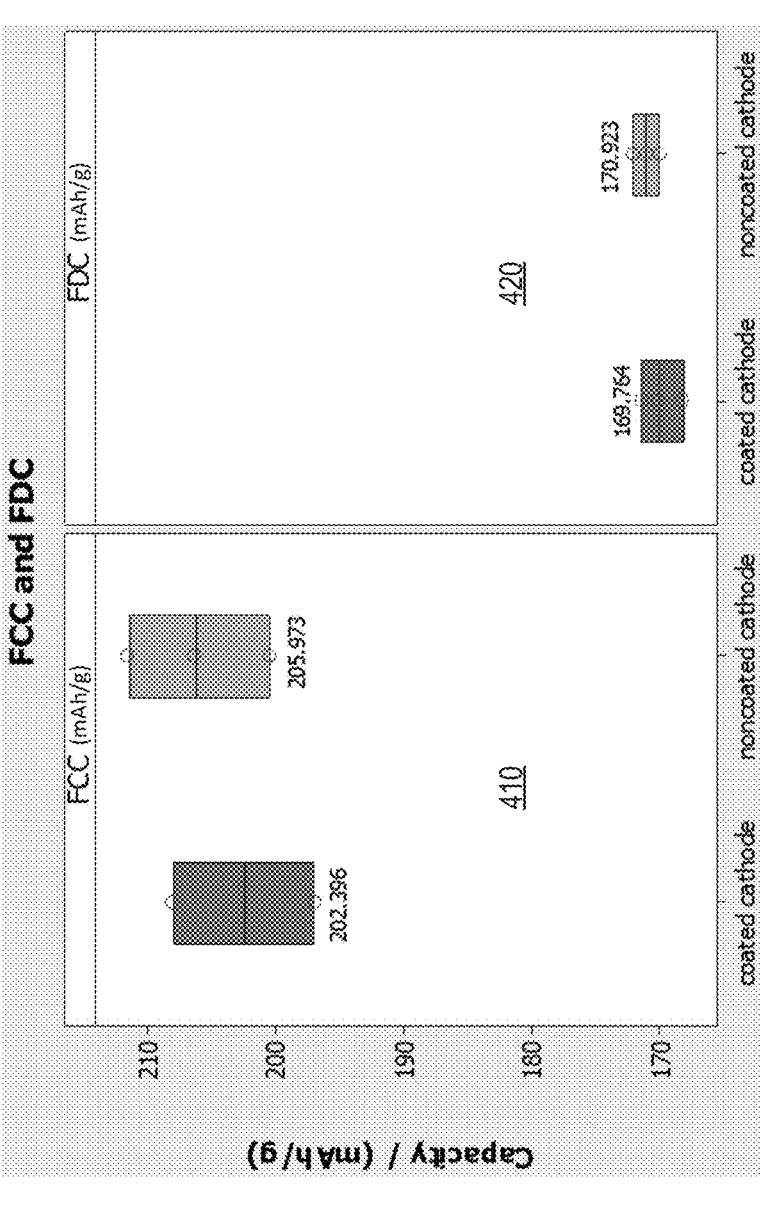
FIG. 4A

ELECTRODE WITH FLAME RETARDANT ADDITIVES AND METHOD AND SYSTEMS FOR PREPARATION AND USE

CROSS REFERENCE TO RELATED APPLICATIONS

The present application is a U.S. National Phase of International Application No. PCT/US2019/055997, entitled "ELECTRODE WITH FLAME RETARDANT ADDITIVES AND METHOD AND SYSTEMS FOR PREPARATION AND USE," filed on Oct. 11, 2019. International Application No. PCT/US2019/055997 claims priority to U.S. Provisional Application No. 62/749,042, entitled "ELECTRODE WITH FLAME RETARDANT ADDITIVES AND METHOD AND SYSTEMS FOR PREPARATION AND USE," and filed on Oct. 22, 2018. The entire contents of each of the above-identified applications are hereby incorporated by reference for all purposes.

FIELD

The present description relates generally to an electrode material and methods for preparation and use in lithium ion batteries.

BACKGROUND AND SUMMARY

Lithium (Li) ion batteries are and have been widely used in a number of different applications, including, but not limited to, consumer electronics, uninterruptible power supplies, transportation, and stationary applications. To meet the increasing demand for energy storage, particularly for use in electric vehicles, attention has shifted towards more energy-dense lithium mixed metal oxide layered structured materials which have high energy density, large voltage windows, and good cycle life compared to other material counterparts. For example, high-nickel positive electrode active materials, such as lithium nickel manganese cobalt oxide ($LiNi_xM-n_yCo_{1-x-y}O_2$ or NMC) and lithium nickel cobalt aluminum oxide ($LiNixCo_yAl_{1-x-y}O_2$ or NCA), have been used to produce high energy Li ion batteries. These layered $LiMO_2$ compounds offer a higher capacity of up to approximately 200 mAh/g at potentials greater than 3.0 V vs. $Li/Li^+$ compared to other materials.

It is desired to continue to increase the energy density of Li ion batteries to meet the demands required by current applications and markets, such as the electric vehicle market. By increasing nickel content or charge voltage of NMC or NCA materials, an improved energy density can be obtained. However, increasing density comes with drawbacks which must be addressed. For example, both high nickel content and overcharge conditions used to achieve high capacity can cause structural thermal instability issues that can lead to thermal runaway or explosion. In this regard, an increased nickel amount results in a larger percentage of surface nickel that is exposed to the electrolyte. Electrolyte molecules are oxidized by $Ni^{3+}$ or $Ni^{4+}$ in delithiated cathodes, causing unwanted cathode and electrolyte degradation. During overcharge or overheating abuse conditions, lithium metal oxide layered materials lose $O_2$ and transform into a spinel and rock salt phase. Both the side reactions between cathode and electrolyte and the phase transfer reactions are exothermic and result in the battery temperature rising. The released heat promotes more side reactions to occur between cathode and electrolyte, as well as more phase transfer reactions. When the accumulated heat raises the cell temperature to the electrolyte flash point, the flammable electrolyte initially reacts with $O_2$ via the phase transfer reaction, and then with $O_2$ in air when the cell package is broken by volume expanding during the heat propagation. Fire and explosion are the worst-case scenarios for the thermal runaway.

Attempts have been made to prevent the heat propagation reactions and improve battery safety. Surface coatings have been considered but suffer lower ionic/electronic conductivity, leading to lowered rate capability of the coated cathode materials, or the coating materials may be incompatible with the active material, such as NMC or NCA, due to their low working voltages causing degradation to the host materials. In some examples, a structural mismatch may exist between a coating and the substrate material, leading to undesired stacking, which may block the diffusion path for Li ions.

In one approach as disclosed in U.S. Patent Application Publication No. 2017/0040600, a flame retardant metal hydroxide is disposed in a hollow part of secondary particles and between primary particles. The material is made through a process whereby NMC is mixed with metal salts. The metal salts are reduced to metal hydroxide by moisture and then the excess moisture is removed. However, since the metal hydroxide is crystalized inside the hollow portion of the cathode particles, the size of the metal hydroxide is not able to be controlled during the drying process resulting in substantial variation which may adversely affect performance. Further, the anions of the metal hydroxide source are left within the material in the process. These extra anions interfere with the electrochemical reaction between cathode and electrolyte, or even dissolve into electrolyte solvent and migrate to the anode side resulting in increased risk of unwanted side reactions.

Similarly, an approach shown in U.S. Pat. No. 7,666,551 provides a continuous coating layer which blocks the Li-electrolyte interface during charge and discharge. Lithium carbonate is used in the coating layer to improve the compromised lithium ion conductivity. However, lithium residue on the surface of the cathode material must be strictly controlled during the process. Lithium carbonate, as one of the lithium residue sources, has a high pH value during the slurry-making step, resulting in slurry gelation. Further, the coating layer was claimed as being a three-component blend, wherein benefits (e.g., thermal stabilization) from a given coating layer component may be decreased by the competing presence of another coating layer component conferring another benefit (e.g., improvement of lithium ion conductivity).

The inventors have identified the above problems and have determined solutions to at least partially solve them. As detailed herein, to overcome the performance degradation and increase thermal reliability of NMC, NCA, or other positive electrode active materials, an electrode active material is described for a lithium ion battery including a core composed of a lithium mixed metal oxide layered structured material, such as NMC and NCA, and flame-retardant dusting particles, where the dusting particles are partially retained within the surface of the core. The dusting particles may be smaller than 20 μm. The flame-retardant dusting particles stabilize the large interface between the host electrode materials and the electrolyte by forming a contact interface on the host electrode materials to control contact with electrolyte. In some examples, the flame-retardant dusting coating enhances the thermal stability of the material and enhances cycle life by neutralizing the hydrofluoric acid (HF) generated by the reaction between the electrolyte and moisture in the electrolyte.

As a further example, the inventors have disclosed a method for manufacturing a positive electrode active material including preparing a powder of lithium metal composite core particles. The method further includes obtaining a powder of flame retardant coating particles, wherein the coating particles have a size of less than 20 μm. The size may be selected based on the decomposition temperature desired to control the battery temperature according to different battery chemistries. The coating particles may be mixed with the lithium metal composite core particles to form a dusted core with the size-selected coating particles partially retained within the surface of the core. The dusting does not increase lithium ion diffusion resistance, allowing lithium ions to move in and out of the active material easier as compared to other coatings. Without having to add a lithium ion diffusion enhancer, additional flame retardants can be used to achieve the desired heat absorbing target.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A and 4B shows first charge capacity (FCC) and first discharge capacity (FDC) box plots for coated cathodes and uncoated cathodes.

DETAILED DESCRIPTION

Figure 1:
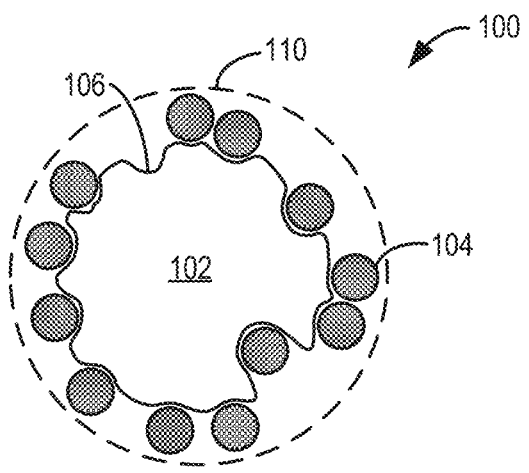
FIG. 1 shows a schematic illustration of a coated electrode active material with dusting particles.

The following description relates to systems and methods for an electrode active material including a lithiated compound core and dusting particles. The core may be a lithium composite metal, such as a lithium intercalation compound, a lithium metal oxide, a lithium metal phosphate, or a combination thereof. The core may be dusted with flame retardant particles or dusting particles including one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, or polyacrylonitrile. Herein, aluminum hydroxide may refer to a compound having a composition of $Al(OH)_3$, aluminum oxide may refer to a compound having a composition of $Al_2O_3$, and aluminum hydroxide oxide may refer to a compound having a composition of $AlO(OH)$. FIG. 1 shows a schematic illustration of a core coated with dusting particles, where the dusting particles are partially retained within a surface of the core.

Figure 2A:
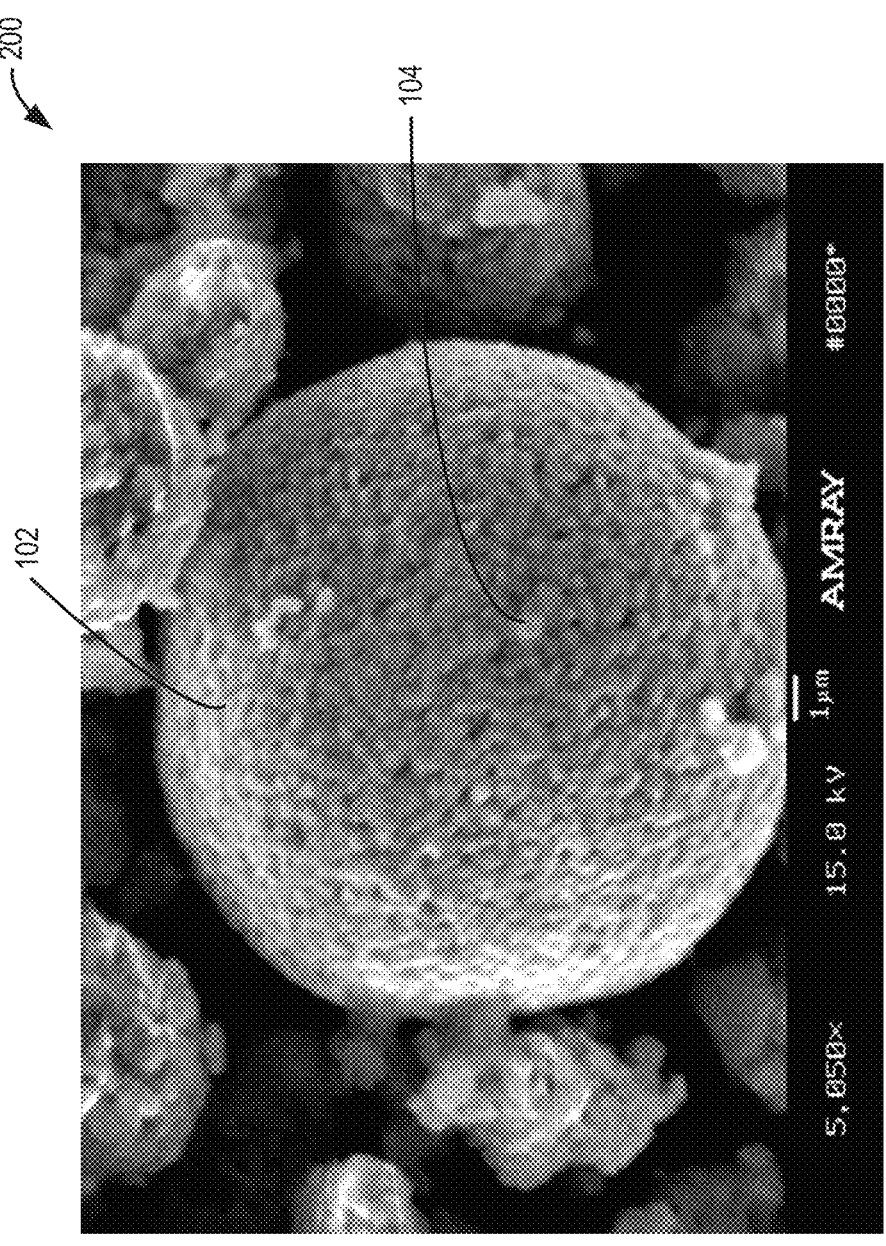
FIGS. 2A and 2B show scanning electron microscope (SEM) images of coated electrode active material particles and uncoated electrode active material particles.
Figure 2B:
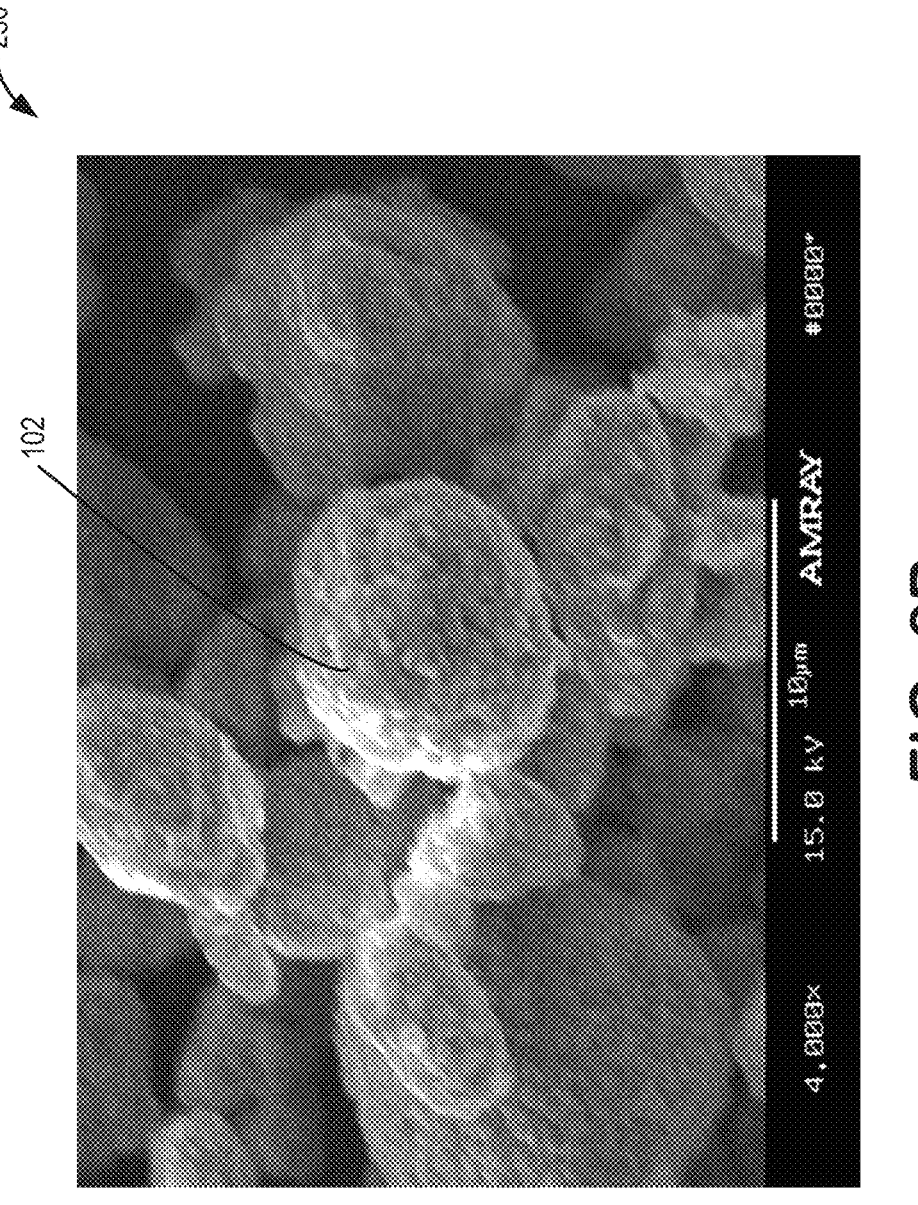

Scanning electron microscope (SEM) images of example electrode active material particles are shown in FIGS. 2A and 2B, where FIG. 2A shows the core coated with dusting particles and FIG. 2B shows an uncoated core. As shown, the dusting particles may cover a partial surface area of the core without disruption to a surface morphology of the core.

Figure 13:
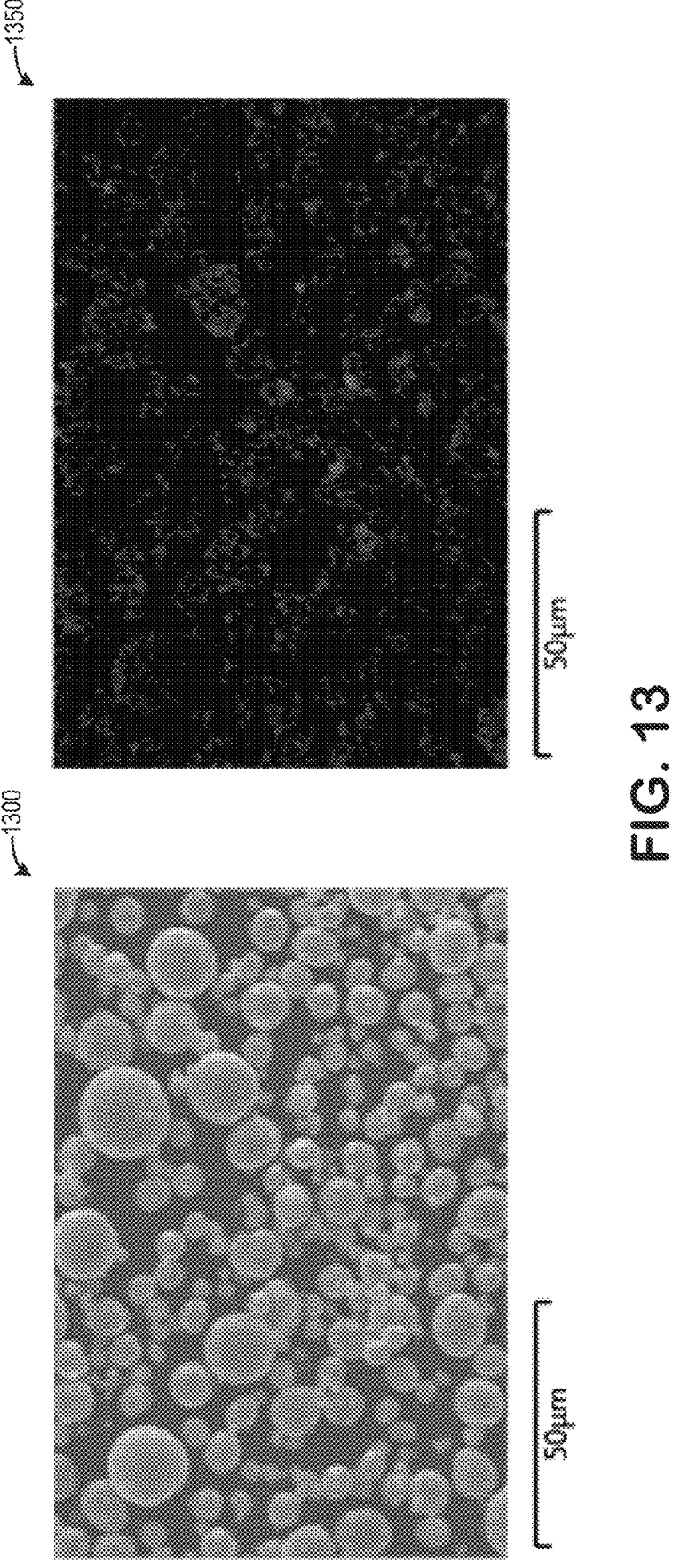
FIG. 13 shows SEM and energy dispersive X-ray spectroscopy (EDS) mapping images of coated positive electrode active material particles.

SEM and energy dispersive X-ray spectroscopy (EDS) mapping images of example positive electrode active material particles coated with $Al(OH)_3$ are shown in FIG. 13. Comparison between the SEM and EDS images evidence a distribution of aluminum as a result of dusting the positive electrode active material particles with $Al(OH)_3$ coating particles.

Figure 3:
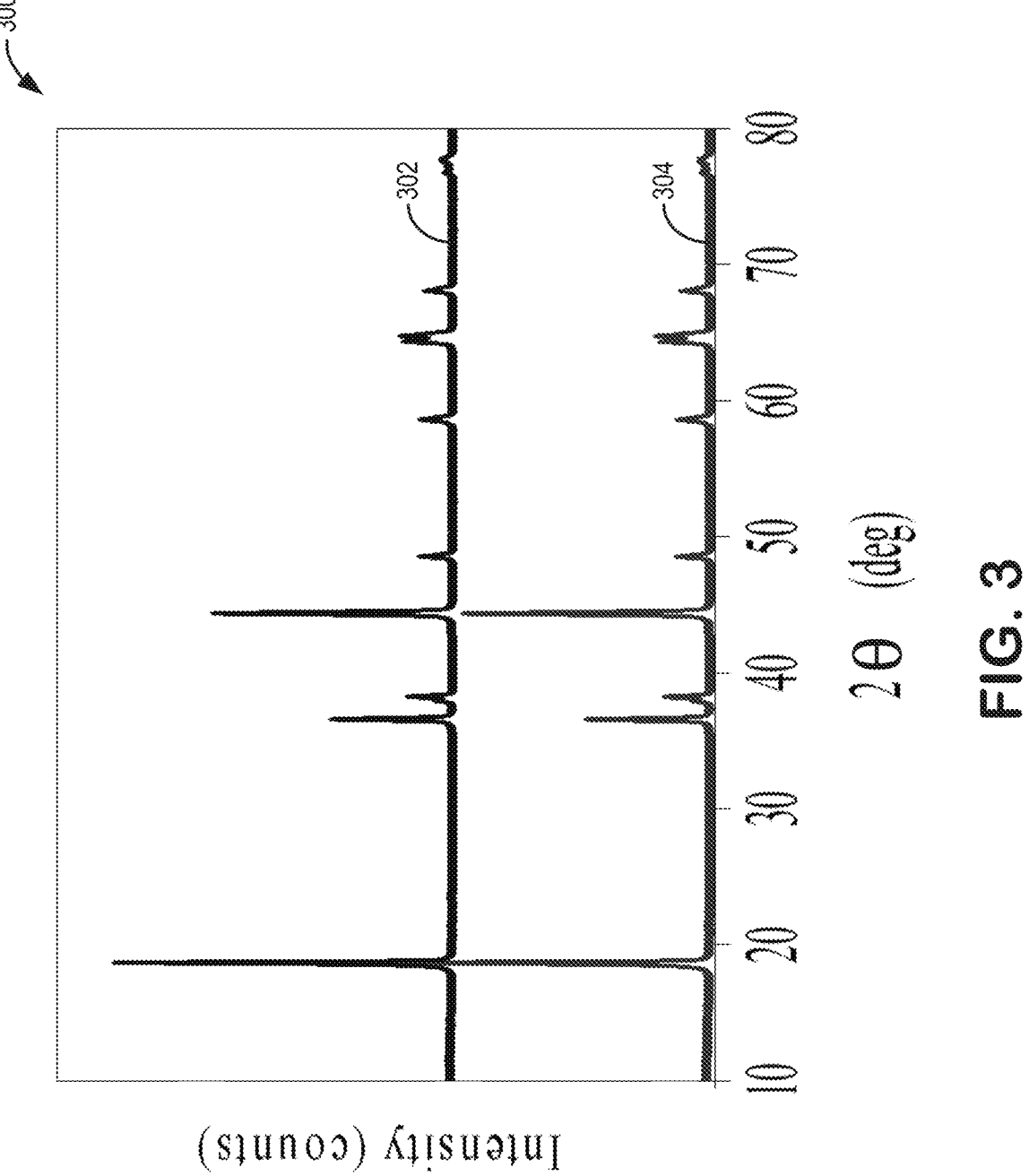
FIG. 3 provides a comparison of X-ray diffraction (XRD) patterns of a coated cathode and an uncoated cathode.

X-ray diffraction (XRD) patterns of an uncoated cathode versus a coated cathode with flame-retardant dusting particles are shown in FIG. 3. As described in detail below, the XRD patterns show that the dusting particles provide a physical coating that does not restrict the electrode active material properties of the core particles.

Figure 4B:
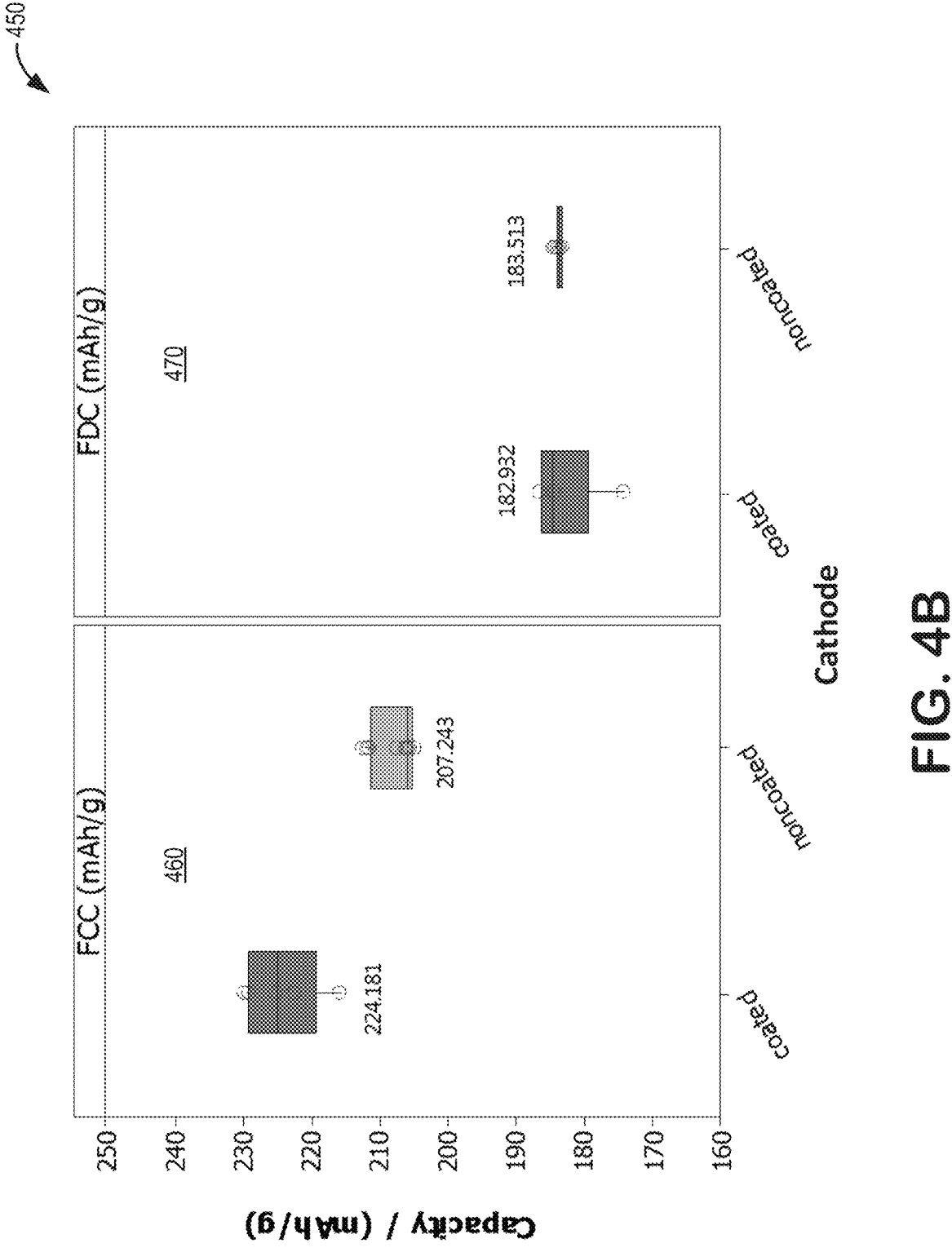

Box plots showing first charge capacities (FCCs) and first discharge capacities (FDCs) of a first uncoated cathode and a first coated cathode are shown in FIG. 4A. FCCs and FDCs of a scaled-up second uncoated cathode and a second coated cathode are shown in FIG. 4B. As described in detail below, the FCCs and the FDCs in FIGS. 4A and 4B illustrate capacity retention advantages of the core particles when the dusting coating is applied.

Figure 5:
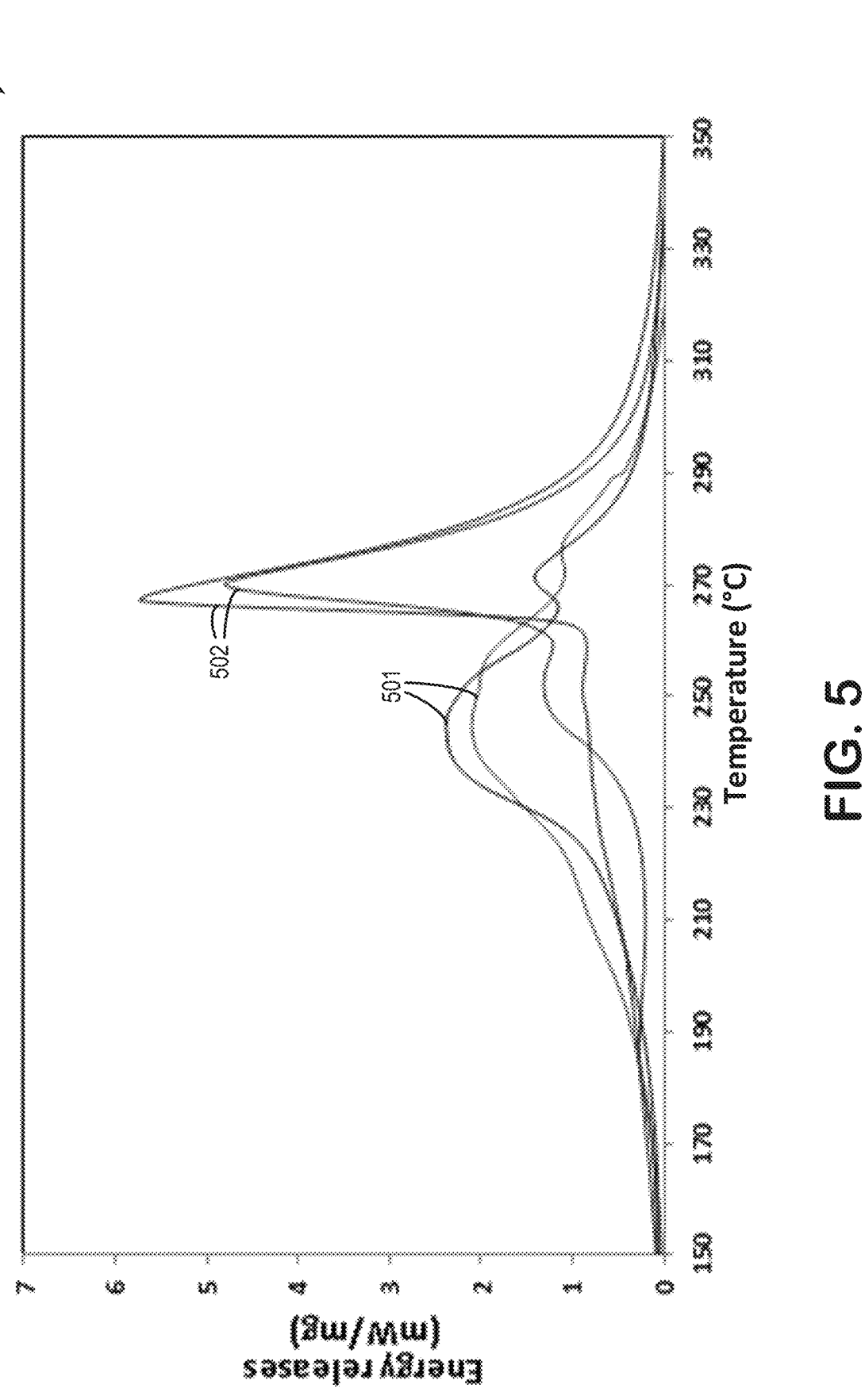
FIG. 5 shows differential scanning calorimetry (DSC) curves of coated cathodes and uncoated cathodes.

Differential scanning calorimetry (DSC) curves of coated cathodes and DSC curves of uncoated cathodes are shown in FIG. 5. As illustrated, the coated cathodes have a slower increase in heat release compared to the uncoated cathodes. This slower increase in heat release indicates a higher level of thermal stability due to a milder exothermic phase transfer compared to the uncoated cathodes.

Figure 6:
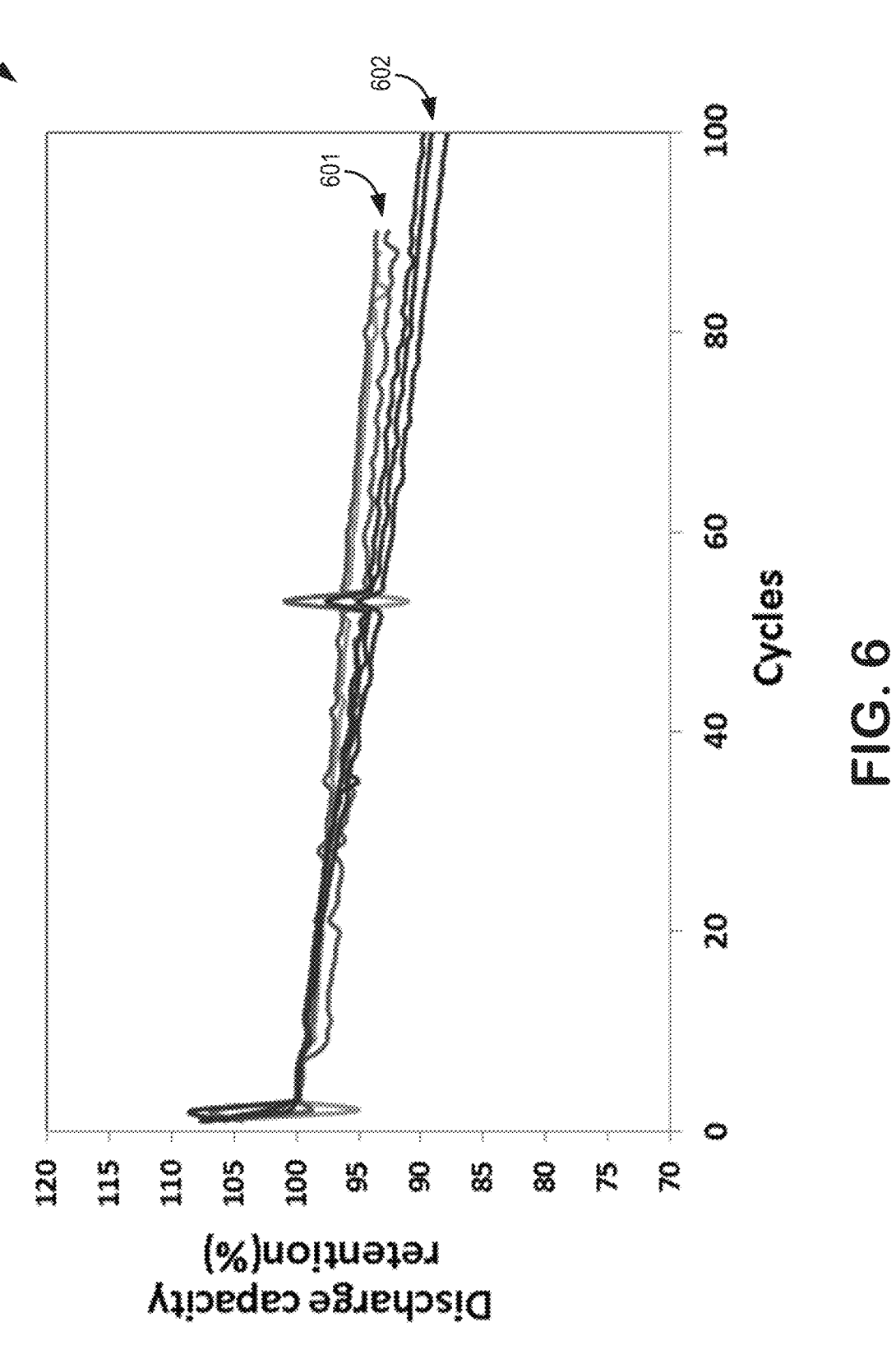
FIG. 6 shows capacity retention during cycling of coated cathodes and uncoated cathodes.

Capacity retention during cycling of coated cathodes and capacity retention during cycling of uncoated cathodes are shown in FIG. 6. As described in detail below, the capacity retention curves in FIG. 6 indicate increased cycle life performances of the coated cathodes as compared to cycle life performances of the uncoated cathodes.

Capacity retention during cycling of coated cathodes and uncoated cathodes in 93450 format cells are shown in FIG.

7. As described in detail below, state of charge (SOC) curves in FIG. 7 indicate increased cycle life performances of the coated cathodes as compared to cycle life performances of the uncoated cathodes. In these examples, the flame-retardant dusting coating, as described herein, enhances thermal stability of the material and improves cycle life by neutralizing the hydrofluoric acid (HF) generated by the reaction between the electrolyte and moisture in the electrolyte.

Figure 8:
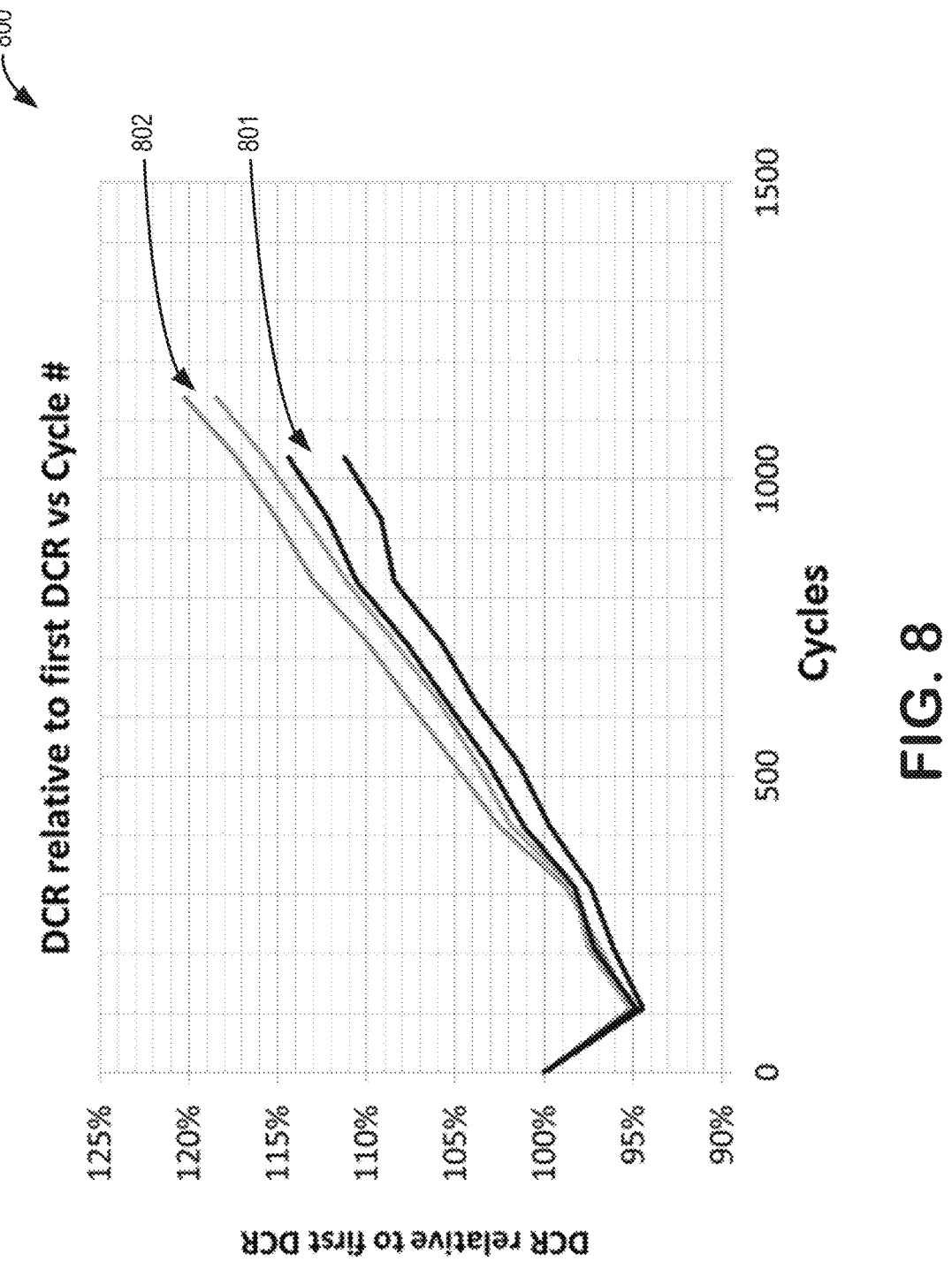
FIG. 8 shows relative DCR resistance curves of coated cathodes and uncoated cathodes during 45° C. cycling in 93450 format cells.
Figure 9:
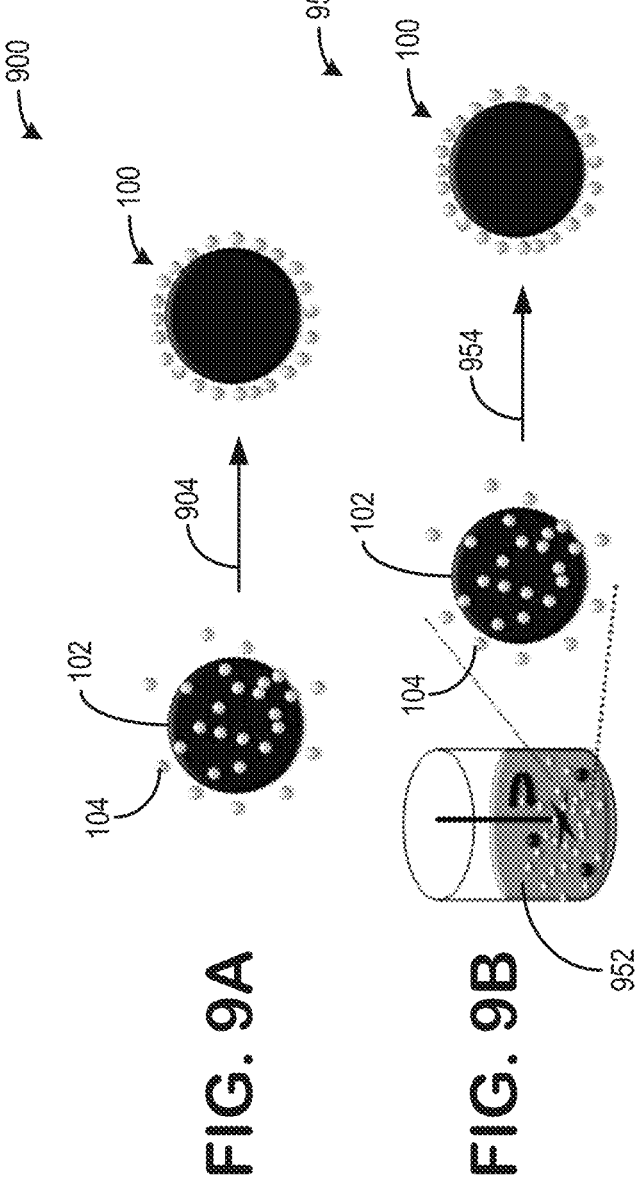
FIGS. 9A and 9B show methods for coating a positive electrode active material particle with dusting particles.

DCR curves of coated cathodes and DCR curves of uncoated cathodes are shown in FIG. 8. The DCR curves in FIG. 8 indicate increased cycle life performances of the coated cathodes as compared to cycle life performances of the uncoated cathodes.

Figures 14, 15:
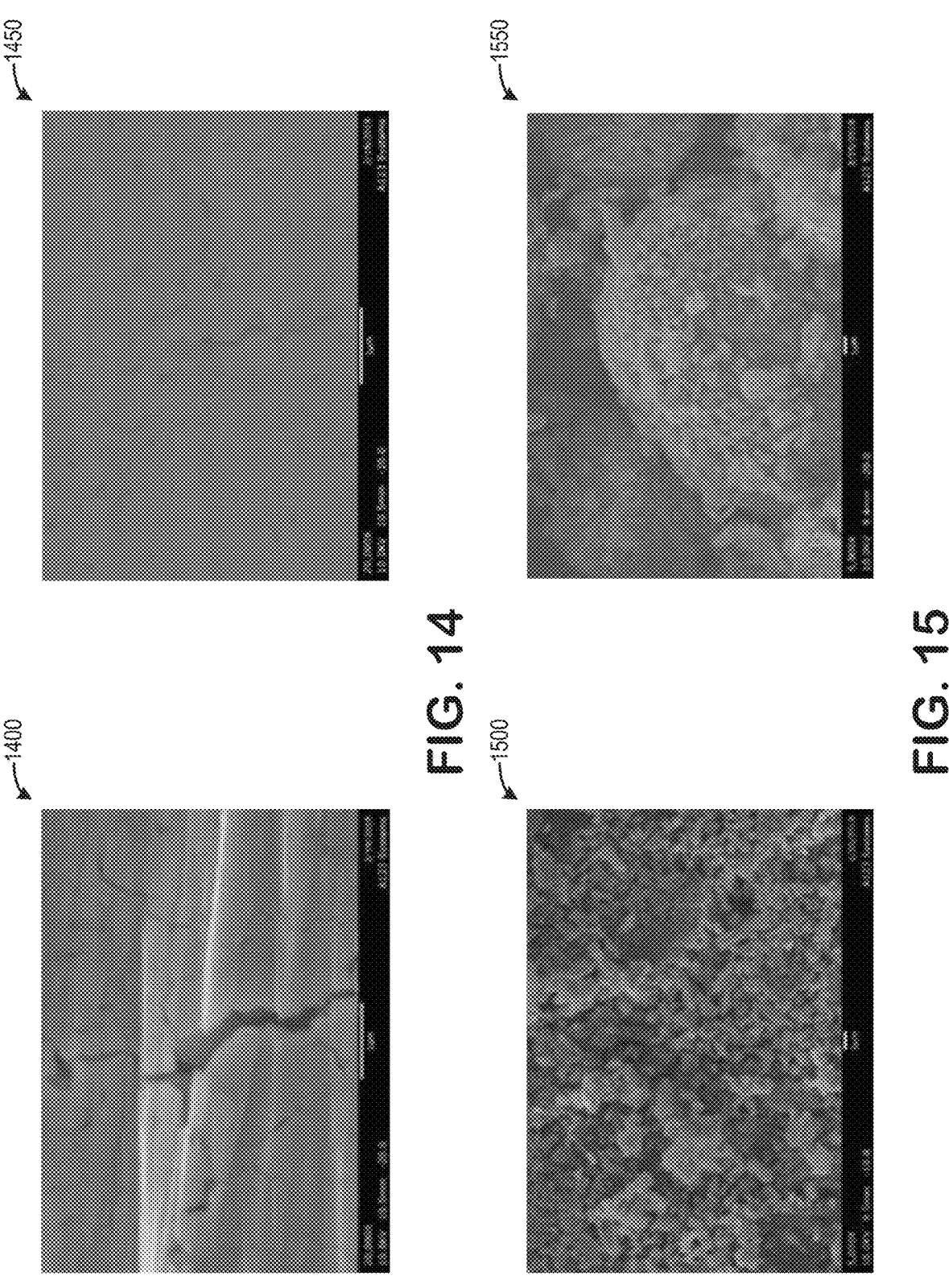
FIG. 14 shows cross-sectional SEM images of an uncoated positive electrode active material particle and a coated positive electrode active material particle after cycling.
FIG. 15 shows SEM images of an uncoated positive electrode active material particle and a coated positive electrode active material particle after cycling.

Cross-sectional SEM images of an uncoated positive electrode active material particle and a coated positive electrode active material particle are shown in FIG. 14. As shown, a severity of particle cracking observed in the uncoated positive electrode active material particle may be limited in the coated positive electrode active material particle by a protecting effect afforded by dusting particles coated thereon.

Further SEM images of uncoated positive electrode active material particles and coated positive electrode active material particles are shown in FIG. 15. As shown, severe particle cracking observed in the uncoated positive electrode active material particles may result in particle breakdown, whereas the coated positive electrode active material particles retain a secondary particulate structure.

The electrode active materials may be prepared using a number of different methods. Example methods for preparing the disclosed electrode active material with a core coated with the dusting particles is illustrated in FIGS. 9A-11, with a method for dry coating shown in FIGS. 9A and 10 and a method for wet coating shown in FIGS. 9B and 11.

Figure 12:
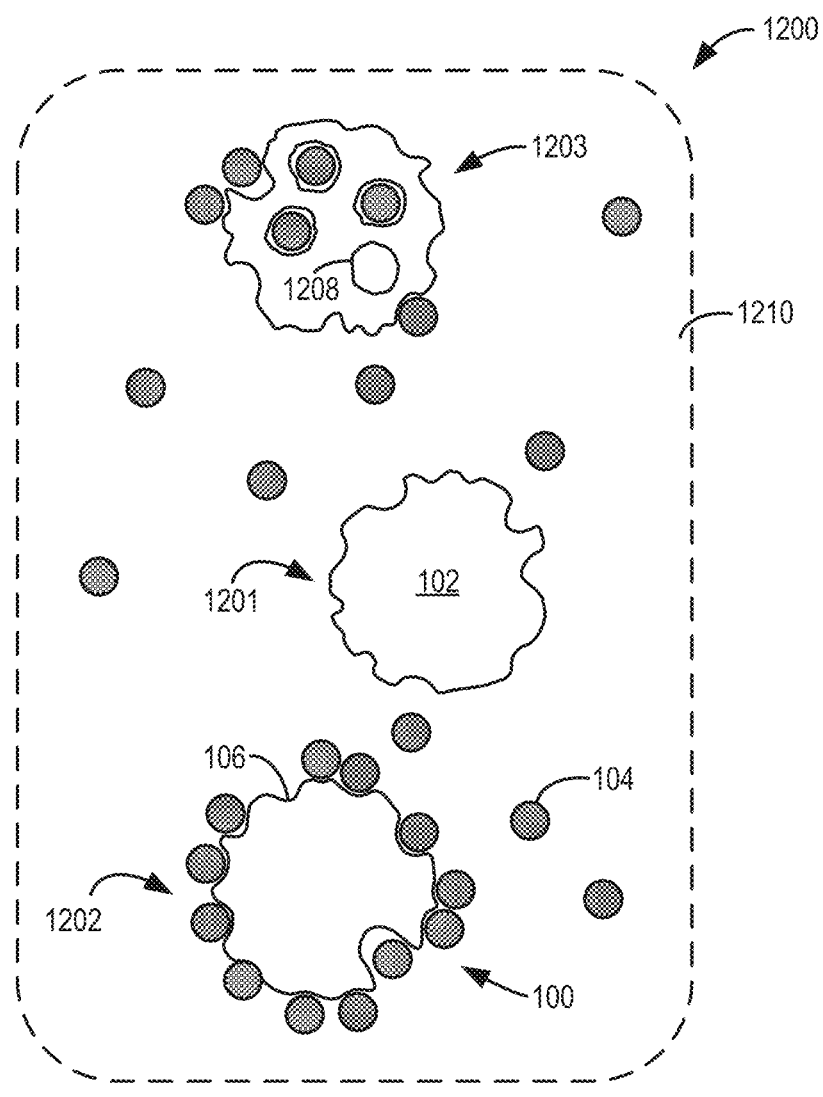
FIG. 12 shows a schematic illustration of an example cathode system including positive electrode active material particles and dusting particles.

The dusting particles may adhere to the core in various configurations. FIG. 12 shows a schematic illustration of an example cathode system including a core and dusting particles combined in a plurality of manners.

Referring now to FIG. 1, a coated positive electrode active material particle 100 is shown. The coated positive electrode active material particle 100 is schematically illustrated as having a core 102 surrounded by dusting particles 104.

The core or core particle 102 may be composed of a lithium metal composite. The lithium metal composite may be a lithium intercalation compound, a lithium metal oxide, a lithium metal phosphate, or a combination thereof, but is not limited to these two types of electrochemically active materials. For example, the core may be a lithium mixed metal oxide layered structured material. In some examples, an average size of the core particles 102 is at least 1 μm and at most 20 μm. In other examples, the average size of the core particles 102 is at least 3 μm and at most 20 μm. In other examples, the average size of the core particles 102 is at least 10 μm and at most 20 μm. In other examples, the average size of the core particles 102 is at least 10 μm and at most 15 μm. In further examples, the average size of the core particles 102 is about 10 μm.

In some examples, the lithium metal composite may include one or more metals selected from the group including, but not limited to, Ni, Mn, Co, Al, Mg, Y, Nd, B, Ca, V, Zn, and combinations thereof. In other examples, the one or more metals may be selected from the group including, but not limited to, Ni, Mn, Co, Al, Mg, Y, Nd, B, Ca, V, Fe, Ga, Nb, Cr, Mo, W, Tc, Ru, Rh, Ir, Pd, Cu, Ge, Si, In, Ag, Cd, Zn, and combinations thereof. In some examples, the lithium metal composite may have a general structural formula of one or more of $LiMeO_2$ and $LiMePO_4$, where Me is one or more metals. In one example, the lithium metal oxide may include a lithium nickel manganese cobalt oxide (NMC). The lithium nickel manganese cobalt oxide may have a structural formula of $LiNi_xMn_yCo_{1-x-y}O_2$.

In another example, the lithium metal oxide may include a lithium nickel cobalt aluminum oxide (NCA). The lithium nickel cobalt aluminum oxide may have a structural formula of $LiNi_xCo_yAl_{1-x-y}O_2$.

In yet another example, the lithium metal oxide may include a lithium nickel cobalt manganese aluminum oxide (NCMA). The lithium nickel cobalt manganese aluminum oxide may have a structural formula of $LiNi_xCo_yMn_zAl_{1-x-y-z}O_2$.

In a further example, the lithium metal composite may include a lithium metal phosphate, the lithium metal phosphate including one or more metals selected from the group including Fe, V, Mn, and combinations thereof.

In one example, the lithium metal phosphate may include a lithium iron phosphate (LFP). The lithium iron phosphate may have a structural formula of $LiFePO_4$.

As described above, where the core 102 is a lithium metal oxide including Ni (such as when the lithium metal oxide is NMC or NCA), concerns as to thermal instability may be raised. As discussed and disclosed herein, by covering a partial surface of the core 102 with dusting particles 104, the thermal instability issues may be addressed.

The dusting particles 104, or flame retardant particles 104, may be a thermally stabilizing material such as a flame retardant and may include one or more flame retardant materials. In some examples, the one or more flame retardant materials may include one or more magnesium-containing compounds (e.g., magnesium hydroxide, magnesium oxide, magnesium carbonate, magnesium hydrogen carbonate, etc.). In some examples, the one or more flame retardant materials may include one or more aluminum-containing compounds (e.g., aluminum hydroxide, aluminum oxide, aluminum hydroxide oxide, etc.). For example, the dusting particles 104 may include zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, or polyacrylonitrile, or combinations thereof. In some examples, the dusting particles 104 may be composed of aluminum hydroxide. In further examples, the dusting particles 104 being composed of aluminum hydroxide may include further aluminum compounds in addition to the aluminum hydroxide, such as aluminum oxide and/or aluminum oxide hydroxide, wherein the aluminum oxide and/or aluminum oxide hydroxide are produced by dehydration of a portion of the aluminum hydroxide. The dusting particles 104 may provide a partial blocking interface such that the entire surface of the core particles 102 is not fully exposed directly to the electrolyte.

The dusting particles 104 may have an average size of less than 20 μm. In some examples, an average size of the dusting particles 104 may range between 0.01 μm to 20 μm. In other examples, the average size of the dusting particles 104 may be 15 μm or less than 15 μm. Further, in some examples, an average size of the dusting particles 104 may range between 0.01 μm to 15 μm. In other examples, the average size of the dusting particles 104 may be less than 10 μm. Further, in some examples, an average size of the dusting particles 104 may range between 0.01 μm to 10 μm. In other examples, the average size of the dusting particles 104 may be less than 5 μm. Further, in some examples, an average size of the dusting particles 104 may range between 0.01 μm to 5 μm. In other examples, the average size of the dusting particles 104 may be less than 3 μm. Further, in some examples, an average size of the dusting particles 104 may range between 0.01 μm to 3 μm. In other examples, the average size of the dusting particles 104 may be 1 μm or 1 μm or less. Further, in some examples, an average size of the dusting particles 104 may range between 0.01 μm to 1 μm.

The dusting particles 104 may be applied to the core particles 102 by a number of methods. In some examples, the core 102 may have a surface comprising one or more surface structures or fissures 106. These surface fissures may be openings or cracks within the surface of the core particle 102. The size and depth of the fissures 106 may vary. The surface fissures may increase a surface area of the core particle 102.

In forming the electrode active material, the dusting particles 104 may be mixed such that the dusting particles 104 dust or cover the core 102. In some examples, dusting particles 104 may fit within the fissures 106 such that the dusting particles 104 are retained partially on and within the core surface. The dusting particles 104 may adhere to the surface structures via van der Waals molecular forces and/or mechanical forces. As such, a size of each of the dusting particles 104 may be complementary to a size of the reciprocal receiving fissures 106 such that the dusting particles 104 may be partially secured therein. In this way, a coating 110 may include a dusting of dusting particles 104 on the surface of the core particle 102.

In some examples, the fissures 106 may be irregular such that the fissures 106 may have different shapes and sizes. In some examples, the dusting particles 104 may be pre-milled to a selected size such that the majority of dusting particles 104 are substantially identical in size. This average pre-selected size of the dusting particles 104 results in the retention of the selectively-sized dusting particles 104 on and partially within the fissures 106 of complementary size on the surface of the core 102. In other examples, dusting particles 104 may have different sizes where the dusting particles 104 are retained in matching sized reciprocal fissures 106. Using a predetermined size ensures a desired amount of coverage of the core 102 along the fissures 106. Dusting particles 104 retained in the fissures 106 of the core particles 102 reduce an overall surface area of the core 102 exposed to an electrolyte in a battery as compared to core particles 102 not coated with dusting particles 104.

In this manner, the dusting particles 104 may function as a shield, such that the dusting particles 104 may mitigate undesired side reactions between the core particles 102 in a battery and an electrolyte in the battery. More specifically, the dusting particles 104 may act as a catalyst in decreasing an exothermic response of the core particles 102 when in contact with the electrolyte in the battery. Thus, the dusting particles 104 may provide thermal stabilization to the coated positive electrode active material particle 100.

As described above, the dusting particles 104 may cover or partially cover at least a portion of the surface of the core particles 102. In some examples, the dusting particles 104 may cover greater than 0.1% of the surface area of the core particles 102 and less than 100% of the surface area of the core particles 102. In other examples, the dusting particles 104 may cover a majority of a surface area of the core particles 102. More specifically, the dusting particles 104 may cover greater than 50% of the surface area of the core particles 102 and less than 100% of the surface area of the core particles 102. In some examples, the dusting particles 104 may cover greater than 50% of the surface area of the core particles 102 and less than 90% of the surface area of the core particles 102. In other examples, the coverage may be between 50-70%.

The dusting particles 104 may be present within the active material at greater than 0% by weight and less than 50% by weight. In some examples, the dusting particles 104 may be present within the active material at greater than 0.1% by weight and less than 50% by weight. In some examples, the dusting particles 104 may be present within the active material at greater than 0.1% by weight and less than 30% by weight. In other examples, the dusting particles 104 may be present within the active material at greater than 0.1% by weight and less than 10% by weight. In other examples, the dusting particles 104 may be present within the active material at greater than 0.1% by weight and less than 5% by weight. In further examples, the dusting particles 104 may be composed of aluminum hydroxide, and may further be present within the active material between 0.1-50% by weight.

As described above, the coated positive electrode active material particle 100 may include an uncovered surface portion where the dusting particles 104 are not present on the surface of the core particle 102. The uncovered portion may be greater than 0% such that the dusting particles 104 permit gaps, exposing the surface of the core particle 102 directly to an electrolyte in a battery. In this way, the uncovered portion of the core particle 102 may protrude through the dusting particles 104. By leaving an uncovered portion of the surface of the coated positive electrode active material particle 100 exposed, one or more benefits may be achieved. The one or more benefits may include, but are not limited to, increased charge/discharge rates, decreased manufacturing costs, and faster recharge. Additionally, the uncovered portion of the coated positive electrode active material particle 100 may receive a benefit of a decreased exothermic response when exposed to an electrolyte in a battery, as adjacent dusting particles 104 may absorb heat generated as a result of the exposure.

In some examples, the coated positive electrode active material particle 100 may be substantially covered leaving only a minority of the surface as uncovered. More specifically, a surface area of the core particle 102 exposed may be less than 50% of a total surface area of the core particle 102 and may be greater than 0% of the total surface area of the core particle 102. The surface area of the core particle 102 left uncovered and exposed may depend on desired levels of power, voltage, and/or discharge rate of the coated positive electrode active material particle 100.

Coating 110, composed of the dusting particles 104, although not uniform, in some examples, or continuous, may be considered to envelop the core particles 102. The coating 110, with discrete deposits, may vary in thickness depending on the position of the dusting particles 104 on or within the surface of the core 102. In some examples, the thickness may be considered, at maximum, the approximate size of the dusting particles 104. In other words, the dusting particles 104 may be arranged as a single layer, where a greatest thickness of the coating 110 of the core particles 102 may correspond to a largest particle size of the dusting particles 104. It will be appreciated that, though the coating 110 depicted in FIG. 1 is not uniform, the core particles 102 may be uniformly coated with the dusting particles 104 by a coating process therefor. Herein, "uniform" may be used to describe substantially similar density or coverage of the dusting particles 104 on or in any threshold portion of the surface (e.g., a total surface area, less than the total surface area) of the core particles 102. Further, "continuous" may be used herein to describe complete or substantially complete coverage of the total surface area of the core 102 with a continuous or conformal film. Further, "discrete" may be used herein to describe the coating 110 on the core 102 as being composed of individual dusting particles 104 and not a continuous or conformal film.

In other examples, the coating 110 may be multiple layers thick. For example, in some embodiments, multiple layers of the coating 110 may exist at the surface of the cathode particles (e.g., 102). For example, one or more fissures 106 may retain more dusting particles 104 as compared to other fissures 106. As described above, the dusting particles 104 may be retained in position via van der Waals molecular forces and/or mechanical forces to surfaces of the fissures 106. As an example, one or more dusting particles 104 may be retained on or within the surface structures in a stacking configuration.

The coating 110 may be prepared in a number of different ways. Methods of preparation of the coating 110 are detailed below with reference to FIGS. 9A-11. In some methods, one or more properties of the core particles 102 and the dusting particles 104 may be selectively controlled based on the method of preparation. For example, an average size of the dusting particles 104 may be optimized to increase the coverage of the coating 110 relative to the core 102.

Additionally or alternatively to the mechanical forces retaining the dusting particles 104, in some examples, a heating and/or an annealing process of the dusting particles 104 may be used to adhere the dusting particles 104 with a greater force to the surface of the core 102. The greater force may include one or more of increased mechanical forces, van der Waals molecular forces, hydrogen bonding, ionic bonding, and covalent bonding.

Referring now to FIGS. 2A and 2B, the morphology of the core 102 and dusting particles 104 may be better understood. As detailed below, FIGS. 2A and 2B respectively show a comparison of the morphology between an uncoated and coated electrode active material in accordance with the disclosure. More specifically, the first image 200 (FIG. 2A) and the second image 250 (FIG. 2B) show and contrast a surface morphology of core particles 102 using scanning electron microscope (SEM) imaging.

FIG. 2A shows first image 200 of a coated positive electrode active material particle. In this example, a NMC particle is shown with an aluminum hydroxide dusting coating. As illustrated, the dusting particles 104, shown as aluminum hydroxide in this example, are observed as extending from the surface of the core 102, shown as NMC in this example, and specifically from the secondary particles of the core.

However, the dusting particles 104 do not block the electrolyte contact with the active material surface. Specifically, portions of the core 102 may be directly exposed to an electrolyte in a battery. The portions of the core 102 directly exposed to the electrolyte in the battery may be adjacent to portions of the core 102 covered by the dusting particles 104.

In this observation, the dusting particles 104 may have an average size of less than 1 μm. The size of the dusting particles 104 may result in uniform dispersion onto the core particles 102 while, at the same time, not block the lithium pathway from the surface of the active material. In additional or alternative examples, a non-uniform dispersion of dusting particles 104 may occur by random chance and/or by choice, such that portions of the surface of the core particles 102 may have more dusting particles 104 than other portions of the surface of the core particles 102.

Comparing FIG. 2A with FIG. 2B indicates that the surface morphology remains similar with or without the coating. In this regard, the primary particles are tightly packed to form secondary particles of the core 102. The similarities of the surface morphology indicate that the mixing process of the core particles 102 with the dusting particles 104 results in little or no degradation or change in morphology of the core particles 102. The maintained surface morphology supports the result that there is similar capacity and cycle life of the coated electrode active material as compared to the uncoated core particles 102.

Referring now to FIG. 13, a comparison of an SEM image 1300 and an energy dispersive x-ray spectroscopy (EDS) mapping image 1350, each depicting example coated positive electrode active material particles, is shown. The coated positive electrode active material particles are composed of core particles coated with dusting particles. In the example depicted by FIG. 13, the dusting particles are composed of aluminum hydroxide. Thus, the EDS mapping image 1350 indicates a distribution of aluminum (in the non-black regions therein). Further, it will be understood that respective views depicted by the SEM image 1300 and the EDS mapping image 1350 show the same coated positive electrode active material particles. As such, by comparing the SEM image 1300 and EDS mapping image 1350, the distribution of aluminum on individual coated positive electrode active material particles may be observed.

As shown, the dusting particles are evenly distributed among the coated positive electrode material particles, indicating that a coating process therefor produces a uniform dusting effect on the core particles. Further, the EDS mapping image 1350 indicates that the coating of dusting particles on the core particles is not continuous, permitting accessibility of an electrolyte in a battery to a surface of the core particles even when coated with the dusting particles. As such, in the coated positive electrode active material particles, increases in DCR may be limited by a presence of unobstructed lithium ion diffusion pathways (as further discussed below with reference to FIG. 8) while still retaining safety benefits and an improved cycle life due to a presence of the dusting particles.

Referring now to FIG. 3, a comparison of an X-ray diffraction (XRD) pattern 302 of a coated electrode active material, specifically NMC with a flame retardant coating, with an XRD pattern 304 of the uncoated electrode active material, specifically NMC, is shown. As illustrated, the XRD patterns are substantially identical, and further show typical peaks of an R3m layered structure.

Of particular note is that there is no extra peak observed for flame-retardant dusting particles. The absence of additional XRD peaks indicates that the dusting particles are very small relative to the core and well dispersed. This observation is in line with the SEM images (as discussed in reference to FIGS. 2A and 2B), which indicate the small dusting particle size relative to the primary and secondary particles of a NMC core.

Further, and as discussed in reference to FIGS. 2A and 2B, the XRD pattern comparison indicates that the method of preparation of the coated electrode active material maintains the crystal structure of the underlying electrode active material particle such that the dusting particles are not reacting with or diffusing into NMC core particles. In this regard, the coating is a physical coating process without change to the chemical properties of either the core or the dusting particles.

As another example, the coating process may involve heating the dusting particles (for example Al) resulting in doping of the core particles with the dusting particles. In such an example, the dusting particles may be adhered to and/or embedded within the core particles such that the core particles may be doped with the dusting particles. Due to sensitivity limits, in some examples, the dusting particles embedded within the core particles may not be detected by XRD measurements.

FIGS. 4A and 4B further provide a comparison of first charge capacities (FCCs) and first discharge capacities (FDCs) of the disclosed coated electrode active material, specifically NMC with a flame retardant coating, with FCCs and FDCs of the uncoated electrode active material, specifically NMC. FIG. 4A illustrates 50 mg scale samples tested in half coin cells. FIG. 4B illustrates a scaled-up sample using pouch cells with capacities around 1.7 Ah with 1.5 kg scale samples.

As shown in plot 410 and plot 460, the FCCs of the coated cathode systems are similar to (in plot 410), or higher than (in plot 460), the FCCs of the uncoated cathode systems. Similarly, in plot 420 and plot 470, the FDCs of the coated cathode systems are similar to the FDCs of the uncoated cathode systems. The FCC and FDC of the coated sample when respectively compared to the non-coated sample indicates that the inclusion of a dusted coating does not negatively affect the capacity of the material. This indicates that small-sized dusting particles and a discrete coating process forming a thin partial layer of flame retardant coating on a NMC core surface prevents the coating from affecting the capacity of an underlying base core material.

The coated cathode system of FIG. 4B is a larger mass than the coated cathode system in FIG. 4A. In the sample as tested, a mass of the coated cathode system of FIG. 4A is ~20 mg and a mass of the coated cathode system of FIG. 4B is 9-10 g. Further, the uncoated cathode system of FIG. 4B has a larger mass than the uncoated cathode system in FIG. 4A. As tested, a mass of the uncoated cathode system of FIG. 4A is ~20 mg and a mass of the uncoated cathode system of FIG. 4B is 9-10 g. The FCCs as shown in plot 410 as compared to the FCCs as shown in plot 460 indicate that the FCC is maintained upon scaling up a mass of a cathode system. Further, the FDCs as shown in plot 420 as compared to the FDCs as shown in plot 470 indicate a maintained FDC upon scaling up the mass of the cathode system. Thus, scaling up retains the capacities of the core material.

Referring now to FIG. 5, plot 500 shows differential scanning calorimetry (DSC) curves 501 of coated cathode samples including coated electrode active material particles, specifically an aluminum hydroxide coated NMC, and DSC curves 502 of uncoated cathode samples including uncoated electrode active material particles, specifically uncoated NMC. Widths of the DSC curves 501 indicate a milder rate of heat accumulation with the coated samples versus the steeper curves 502 and more rapid heat accumulation of the uncoated samples. The narrow heat release peak of the uncoated samples requires that the heat release happens within a smaller temperature range. This faster heat accumulation within a small temperature range creates a potential negative thermal impact on a battery that could be critical to the battery in the form of a thermal runaway event.

The slower rate of heat release of the coated samples indicates that the material would have an increased thermal stability effect when used in a battery. In contrast, with the uncoated sample, when the heat release rate of the battery is larger than the heat dissipating rate, heat accumulation may occur and a thermal runaway event may be triggered. The thermal runaway event may include a phase transfer of NMC core particles and a release of oxygen by the core particles. The thermal runaway event may further include a reaction of the oxygen released by the core particles with an electrolyte in the battery, which results in further heat accumulation and a concomitant evaporation of the electrolyte. Such heat accumulation and evaporation may expand a packaging of the battery. The thermal runaway event may further include an increase in pressure in the battery which, in some examples, may result in rupture of the packaging. The thermal runaway event may further include contents of the battery being exposed to air. The exposure to air may result, in some examples, in fire and/or explosion.

To further illustrate the capability of a dusted coating and NMC core providing increased thermal stability to a battery, nail penetration tests were conducted. During the nail penetration tests, a testing condition was set where a nail penetrates a packaging of a battery to create a short circuit between an anode and a cathode within the battery. Further, the penetration of the packaging of the battery exposes an electrolyte in the battery to air. When the heat is released and the electrolyte is exposed to the air, conditions may be optimal for a thermal runaway event to occur.

In the tests as conducted, each of the nail penetration tests included a nail penetrating a packaging of a battery at a rate of 5 mm/s, wherein the battery was at 100% state of charge and a temperature of 23° C. During the course of each of the nail penetration tests, an average maximum temperature of each of the batteries was measured.

As observed during the nail penetration tests, the average maximum temperature of the battery including the coated cathode sample was 61.02° C. and the average maximum temperature of the battery including the uncoated cathode sample was 81.55° C. Thus, the battery including the coated cathode sample was more thermally stable as compared to the battery including the uncoated cathode sample.

Referring now to FIG. 6, plot 600 compares capacity retention curves 601 of coated cathode systems with capacity retention curves 602 of uncoated cathode systems. As illustrated, the capacity retention of the coated material is approximately 95% at 80 cycles compared to approximately 92% at 80 cycles for the uncoated material. The higher capacity retention indicates an increased cycle life performance of a battery with the coated material as compared to a battery with the uncoated material.

The increased cycle life performance of the battery including the coated material may indicate a mitigation of undesired side reactions between electrode active material particles and an electrolyte in the battery. For example, the increased cycle life performance may be a result of the absorption of HF acid in the electrolyte by dusting particles. HF may be generated from the electrolyte reacting with moisture in the cells. In such examples, the HF acid may attack a surface of the uncoated portion of the electrode active material particle and thereby cause capacity degradation during cycling. Additionally, more water is generated when existing moisture reacts with a $LiPF_6$ salt in the electrolyte, generating more HF. Absorbing the generated HF acid stops the propagation reaction, and increases the cycle life of the coated material relative to the uncoated material.

Figure 7:
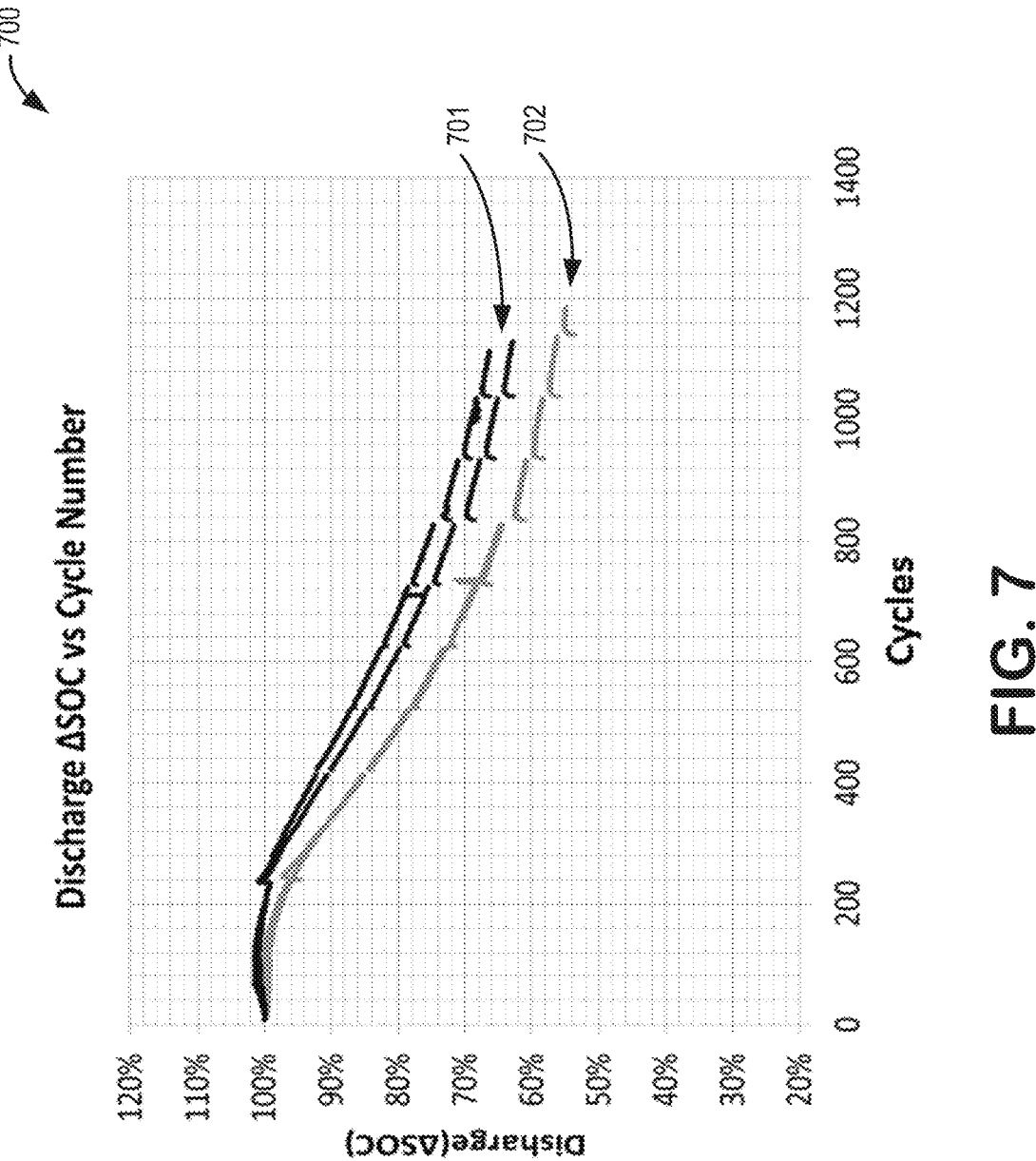
FIG. 7 shows capacity retention during cycling of coated cathodes and uncoated cathodes in 93450 format cells.

Referring now to FIG. 7, plot 700 shows state of charge (SOC) benefits of an aluminum hydroxide coating. Cycle life was compared between a coated material, specifically NMC coated with aluminum hydroxide, and an uncoated material, specifically NMC, as shown by SOC curves 701 and 702, respectively. Tests generating the SOC curves 701 and 702 were conducted at a temperature of 45° C.

As illustrated, the SOC curves 701 illustrate a change in a SOC during a plurality of cycle lives of a battery with the coated material. The SOC curves 702 illustrate a steeper change in the SOC of a battery with the uncoated material. The SOC curves 701 as compared to the SOC curves 702 indicate a higher SOC over 1000 cycles with the coated material as compared to the uncoated material (~68% SOC at 1000 cycles vs. 60% SOC at 1000 cycles, respectively).

The higher SOC over 1000 cycles indicates an improved cycle life performance of a battery with the coated material as compared to a battery with the uncoated material. The improved cycle life performance of the battery with the coated material may indicate a mitigation of undesired side reactions between positive electrode active material particles and an electrolyte in the battery due to the presence of a dusted coating.

In considering the increased cycle life performance of the battery with the coated material, the coating may provide protection of a portion of a NMC core surface which is covered or shielded by dusting particles. The protection of the surface of the core prevents phase transfers of core particles from a layered structure to a spinel and/or a rock-salt phase. The positive electrode active material loses some level of capability of energy storage when phase transfer occurs. The dusting particles may therefore provide increased cycle life performance to a battery.

Referring now to FIG. 8, plot 800 illustrates DCR curves 801 of coated cathode systems in comparison to DCR curves 802 of uncoated cathode systems. Relative DCR values used to plot the DCR curves 801 were determined relative to an initial DCR for the coated cathode systems. Relative DCR values used to plot the DCR curves 802 were determined relative to an initial DCR for the uncoated cathode systems. Tests generating the DCR curves 801 and 802 were conducted at a temperature of 45° C.

The DCR curves 801 indicate a change in a relative DCR during a plurality of cycle lives of a battery with a coated material. The DCR curves 802 indicate a change in a relative DCR during a plurality of cycle lives of a battery with an uncoated material. The DCR curves 801 as compared to the DCR curves 802 indicate a lower relative DCR increase with the coated material. As illustrated, the DCR increased 12% at 1000 cycles for the coated material, specifically NMC with an aluminum hydroxide coating, and 15% at 1000 cycles for the uncoated material, specifically uncoated or bare NMC.

The lower relative DCR suggests an increased cycle life performance of a battery with the coated material. The increased cycle life performance of the battery including the coated material indicates a mitigation of undesired side reactions between positive electrode active material particles and an electrolyte in the battery via the inclusion of dusting particles.

Further, the increased cycle life performance of the battery with the coated material may indicate a protection or shielding of a portion of a NMC core surface by dusting materials. As described above, protection of a portion of the core surface may prevent phase transfers of core particles from a layered structure to a spinel and/or a rock-salt structure and less HF acid attack. The increase in the DCR of the battery with the uncoated material is considered to be a result of the formation of spinel and/or rock-salt phases which have larger resistance at the surface during the charge/discharge process.

Referring now to FIG. 14, a first cross-sectional SEM image 1400 depicting an example uncoated positive electrode active material particle after cycling in a battery and a second cross-sectional SEM image 1450 depicting an example coated positive electrode active material particle after cycling in a battery are shown. As indicated by the first cross-sectional SEM image 1400, the uncoated positive electrode active material particle suffers from severe cracking along primary particle edges therein during charge and discharge cycles. When the cracking occurs, a greater active surface area of the uncoated positive electrode active material particle is exposed. Under battery operating conditions, where the uncoated positive electrode active material particle is immersed in an electrolyte, more side reactions may result, which may concomitantly accelerate cracking. Comparing the first cross-sectional SEM image 1400 to the second cross-sectional image 1450 indicates that a severity of the cracking is significantly reduced in the coated positive electrode active material particle as a result of partial surface protection from the dusting particles coated thereon.

The dusting particles may afford additional benefits to core particles (e.g., positive electrode active material particles) by acting as an HF scavenger. Trace amounts of moisture in a battery including coated positive electrode active material particles may react with an electrolyte therein and generate HF. HF may attack the surface of the core particles, resulting in structural degradation. Further water generated from a reaction therefrom (between the HF and the surface of the core particles) may then react with the electrolyte to generate more HF, resulting in a chain reaction production of HF. The dusting particles of the present disclosure, when coated on the core particles, may reach with the HF and thus stop the chain reaction between the moisture, the electrolyte, and the surface of the core particles.

Further, when coated on the core particles, the dusting particles may further serve to maintain lower valence states in metals (e.g., Ni) of the core particles. However, it will be appreciated that metals included in the core particles may have a wide range of possible valence states (e.g., high or low) depending on the electrode active material included therein. For example, the core particles may include Ni in any valence state.

Referring now to FIG. 15, a first SEM image 1500 depicting example uncoated positive electrode active material particles after cycling in a battery and a second SEM image 1550 depicting example coated positive electrode active material particles after cycling in a battery are shown. As indicated by the first SEM image 1500, secondary particle structure of the uncoated positive electrode active material particles break down into primary particle debris due to increased cracking along primary particle edges therein during charge and discharge cycles. Under battery operating conditions, where the uncoated positive electrode active material particles are immersed in an electrolyte, more side reactions may result, which may concomitantly accelerate cracking and particle breakdown. Comparing the first SEM image 1500 to the second SEM image 1550 indicates that secondary particle structure of the coated positive electrode active material particles may be substantially retained as a result of partial surface protection from the dusting particles coated thereon, which mitigates cracking and subsequent particle breakdown.

The described material may be produced through a number of methods. FIGS. 9A and 9B illustrate two processes, specifically a dry coating process and a wet coating process.

Figure 10:
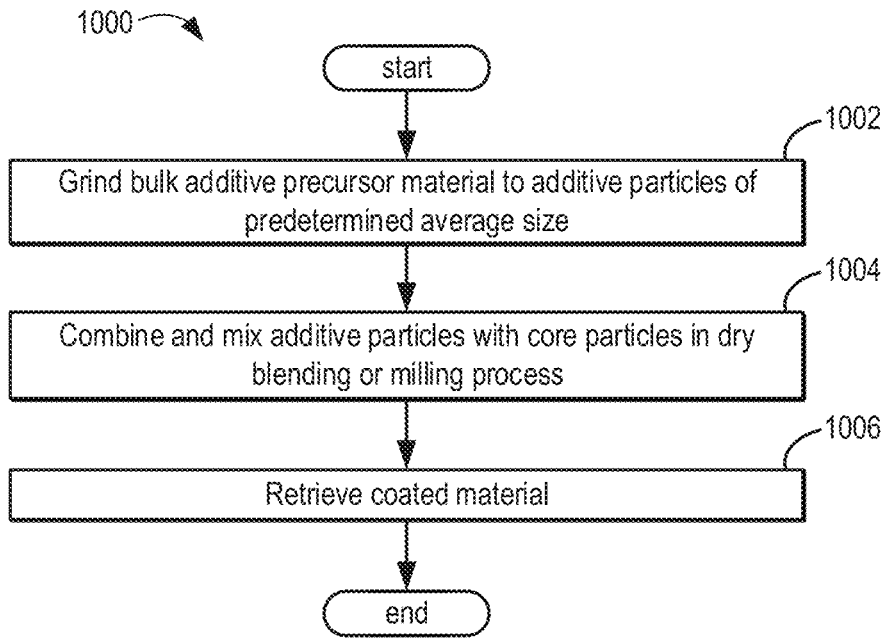
FIG. 10 shows a method for dry mixing positive electrode active material particles and dusting particles.

Turning first to the dry coating process, FIGS. 9A and 10 illustrate a schematic dry coating routine 900 (FIG. 9A) and a corresponding method 1000 (FIG. 10) for coating core particles with a dusting coating as described herein.

FIG. 10 illustrates, at 1002, a first step of grinding a bulk additive precursor material into additive particles (e.g., dusting particles 104).

The bulk additive precursor material may be composed of a flame retardant material. For example, in the testing examples shown above, the bulk additive precursor material was composed of aluminum hydroxide. However, other flame retardants may be used, including, but not limited to, one or more or a combination of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and polyacrylonitrile. Other flame retardants may further be used in the alternative or in combination.

The coating material may be prepared by grinding or otherwise milling the bulk coating material. For example, an auto-grinder may be used or a roller mill, an attritor mill, a SPEX® mill, a Nobilta™ mill, or another suitable mill may be used.

In one example, the dusting particles 104 may be prepared by grinding the bulk additive precursor material with an automated grinder for a selected period depending on the desired size. In one example, the particles may be ground in an auto-grinder for less than one hour to form a fine dusting powder with an average particle size of less than 50 μm, such as less than 1 μm, for example. As a duration of a grinding of the dusting particles 104 increases, the average size of the dusting particles 104 may decrease. Thus, the average size of the dusting particles 104 may be controlled by the length of the grinding process.

In one example, a bulk core precursor material may be composed of a lithium metal composite. The core particles 102 may be prepared from the bulk core precursor material such that an average size of the core particles 102 may be greater than 1 μm and less than 20 μm. In other examples, the core particles 102 may be milled by a supplier and purchased commercially.

At 1004, pre-milled core particles 102 and the dusting particles 104 are combined and mixed in a dry blending or milling process 904. The core particles 102 may be mechanically blended and dry milled using a roller mill with the dusting particles 104 for a selected period. An amount of dusting particles 104 by weight may be greater than 0.1% of the core particles 102 and less than 50% of the core particles 102. In some examples, the amount of dusting particles 104 by weight may be greater than 0.1% of the core particles 102 and less than 50% of the core particles 102. The coating condition may be optimized by the amount of bulk additive precursor material, the mixing time, the grinding time, and grinding conditions. In some examples, the roller mill may include zirconia oxide grinding media balls, which may assist a dispersion of a coating of the dusting particles 104 on the core particles 102. The dusting particles 104 may therefore coat the core particles 102 in a physical manner, in which the dusting particles 104 are adhered to a surface of the core particles 102 by van der Waals molecular forces and/or mechanical forces. In some examples, the coating process may be a physical process and not due to a chemical reaction occurring between the dusting particles 104 and the core particles 102. In other examples, chemical bonds or doping may occur during a heating step.

Specifically, in additional or alternative examples, the dry blending process may involve a heated doping of the core particles 102 with the dusting particles 104. As a resuly, the dusting particles 104 may be adhered to and/or embedded within the core particles 102 such that the core particles 102 may be doped with the dusting particles 104.

At 1006, a resultant coated material (e.g., in a particulate form) is retrieved for use as an electrode active material. The electrode active material may be included in an electrode, such as a cathode or an anode, without departing from the scope of the present disclosure.

Figure 11:
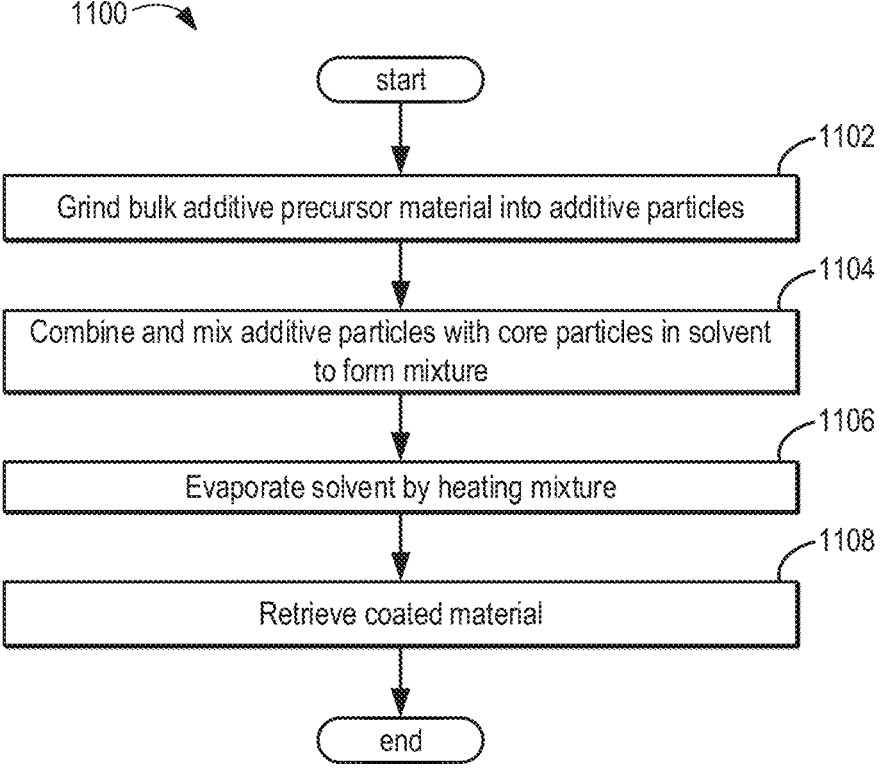
FIG. 11 shows a method for wet mixing positive electrode active material particles and dusting particles.

Referring now to FIGS. 9B and 11, a schematic wet coating routine 950 and a method 1100 for coating core particles 102 with dusting particles 104 is described.

FIG. 11 illustrates, at 1102, a first step of grinding a bulk additive precursor material into additive particles (e.g., dusting particles 104).

The bulk additive precursor material may be composed of a flame retardant material as described above. The dusting particles 104 may be prepared by grinding the bulk additive precursor material as described above to a selected size. The dusting particles 104 are prepared such that an average size of the dusting particles 104 may be less than 50 μm, such as less than 1 μm, for example.

At 1104, the core particles 102 and the dusting particles 104 are combined and mixed in a solvent 952 to form a mixture in a wet blending process 954. The dusting particles 104 may be dissolved and/or mixed in the solvent 952. In some examples, the solvent 952 may be an inorganic solvent, such as, but not limited to, deionized water. In other examples, the solvent 952 may be an organic solvent, such as, but not limited to, ethanol, isopropyl alcohol, or acetone. Other organic and/or inorganic solvents may be used without departing from the scope of the disclosure.

At 1106, the solvent 952 is evaporated from the mixture by heating the mixture. The mixture is considered to be dry after heating at a heating temperature for a duration of time. As an example, the heating temperature may be 80° C. For example, the solvent 952 may be present at 100% at an initiation of the heating. Once the solvent 952 is present at less than a threshold percentage, the heating temperature may be reduced. In some examples, the threshold percentage may be 5%. As such, the heating temperature may gradually decrease as an amount of the solvent decreases.

At 1108, a resultant coated core material (e.g., in a particulate form) is retrieved for use as an electrode active material. The electrode active material may be included in an electrode, such a cathode or an anode, without departing from the scope of the present disclosure.

In some applications, the schematic dry coating routine 900 (as shown in FIG. 9A) has a number of advantages over the schematic wet coating routine 950 (as shown in FIG. 9B). More specifically, the schematic dry coating routine 900 may take less time than the schematic wet coating routine 950. Further, the schematic dry coating routine 900 may be more scalable than the schematic wet coating routine 950. Additionally, the schematic dry coating routine 900 may avoid undesired side reactions between the solvent, the core particles, and/or the dusting particles, which may occur in the schematic wet coating routine 950.

Each of the schematic dry coating routine 900 and the schematic wet coating routine 950 improve over other methods by using a core material and a coating material directly, as opposed to preparing the core particles 102 and/or dusting particles 104 from metal salt precursors. Such methods utilizing metal salt precursors may leave impurities and/or side products along with desired products.

FIG. 12 provides a schematic illustration 1200 of combining and mixing core particles with dusting particles. In the schematic illustration 1200, a cathode system 1210 is for use with a battery. The cathode system 1210 may interface and/or interact with other components of the battery, such as an electrolyte.

As illustrated, both core particles 102 and dusting particles 104 may make up an active material. The core particles 102 and the dusting particles 104 may be combined in one or more manners. In some examples, the dusting or flame retardant particles 104 may directly interact with one or more surface structures of the core particles 102. In other examples, the dusting particles 104 may be detached from the core particles 102. In some examples, a dusting particle 104 may be nearly or entirely free of direct interactions with one or more other dusting particles 104 and/or one or more core particles 102.

In one example, indicated at 1201, a core particle 102 may be nearly or entirely free of direct interaction with dusting particles 104. However, during mixing, an uncoated positive electrode active material particle (e.g., a core particle 102) may come in contact with dusting particles 104. Dusting particles 104 may be retained on or partially within surface structures 106 to form a coated positive electrode active material particle 100 as indicated at 1202. Further, as shown at 1203, in some examples, dusting particles may be retained within a void 1208 of a core particle 102 extending to the surface. In some examples, the void 1208 may be the result of a space between primary particles forming the core particle 102.

In some examples, a surface of a core particle 102 may be irregular such that surface structure retainment interfaces (e.g., 106) may be sized differently along the surface of the core particle 102. Depending on the size of dusting particles 104, a partial coating may be formed on or partially within the surface of the core particle 102.

In an example use, a coated positive electrode active material may be prepared. In some examples, the coated positive electrode active material may be combined in a container with conductive additives and a binder in an organic solvent, thereby comprising a solution. The solution may then be coated and dried onto a cathode current collector to form a cathode.

In some cases, such as in the examples described above, a resultant coated positive electrode active material may be included in a cathode. Further, a battery may be manufactured, such that the battery includes the cathode as described above, an anode, a separator disposed between the cathode and the anode, and an electrolyte, the electrolyte being non-aqueous. The electrolyte may be in the form of a solid, a gel, or a liquid. In some examples, the battery may be a secondary lithium ion battery. In further examples, the battery may be one of a plurality of batteries in a battery pack, wherein each of the plurality of batteries are identically configured as said battery.

In this way, a positive electrode active material may be coated in a flame retardant material to thermally stabilize said positive electrode active material. The flame retardant material may further form a coating on an exterior surface of a cathode system including the positive electrode active material to limit exposure of the cathode system in a battery to an electrolyte in a battery. The technical effect of applying flame retardant material particles to positive electrode active material particles (which thereby constitute a coated positive electrode active material) is to mitigate or prevent thermal runaway events in a battery including the coated positive electrode active material. Further, the coated positive electrode active material provides improved electrochemical performance to a battery including the coated positive electrode active material.

In one example, an electrode active material for a lithium ion battery comprises a lithiated compound core, and flame-retardant dusting particles partially retained within a surface of the lithiated compound core, where the flame-retardant dusting particles have an average size of less than 20 μm, and where an amount of flame-retardant dusting particles by weight is greater than 0.1% of the electrode active material and less than 50% of the electrode active material. A first example of the electrode active material further includes wherein the lithiated compound core is a lithium intercalation compound, a lithium metal oxide, a lithium metal phosphate, or a combination thereof. A second example of the electrode active material, optionally including the first example of the electrode active material, further includes wherein the lithiated compound core is one of NMC, NCA, NCMA, and LFP. A third example of the electrode active material, optionally including one or more of the first and second examples of the electrode active material, further includes wherein the flame-retardant dusting particles are composed of one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and poly-acrylonitrile. A fourth example of the electrode active material, optionally including one or more of the first through third examples of the electrode active material, further includes wherein the flame-retardant dusting particles are composed of aluminum hydroxide. A fifth example of the electrode active material, optionally including one or more of the first through fourth examples of the electrode active material, further includes wherein the electrode active material is included in a cathode. A sixth example of the electrode active material, optionally including one or more of the first through fifth examples of the electrode active material, further includes wherein the electrode active material is included in an anode. A seventh example of the electrode active material, optionally including one or more of the first through eighth examples of the electrode active material, further includes wherein a height of the flame-retardant dusting particles from the surface of the lithiated compound core varies along the surface of the lithiated compound core.

In another example, a method for manufacturing an electrode active material comprises preparing each of a core powder comprised of one or more electrochemically active materials and a dusting powder comprised of one or more flame-retardant materials, and mixing the core powder with greater than 0.1% by weight of the dusting powder and less than 50% by weight of the dusting powder, such that the dusting powder is partially retained within a surface of the core powder. A first example of the method further includes wherein the core powder is one or more of $LiMeO_2$ and $LiMePO_4$, where Me is one or more elements selected from Ni, Mn, Co, Al, Mg, Y, Nd, B, Ca, V, Fe, Ga, Nb, Cr, Mo, W, Tc, Ru, Rh, Ir, Pd, Cu, Ge, Si, In, Ag, Cd, and Zn. A second example of the method, optionally including the first example of the method, further includes wherein the core powder is NMC, NCA, NCMA, or LFP. A third example of the method, optionally including one or more of the first and second examples of the method, further includes wherein the core powder is in the form of particles having an average size of 0.1 to 20 μm. A fourth example of the method, optionally including one or more of the first through third examples of the method, further includes wherein the one or more flame-retardant materials include zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and poly-acrylonitrile. A fifth example of the method, optionally including one or more of the first through fourth examples of the method, further includes wherein the mixing is a dry mixing. A sixth example of the method, optionally including one or more of the first through fifth examples of the method, further includes wherein the mixing is a wet mixing. A seventh example of the method, optionally including one or more of the first through eighth examples of the method, further includes wherein a coverage of the dusting powder on the core powder is greater than 50% of a surface area of the core powder and less than 90% of the surface area of the core powder.

In yet another example, a lithium ion battery comprises a positive electrode comprising a dusted lithium active material, where the dusted lithium active material includes a lithium active core with dusting particles partially covering a surface of the lithium active core and extending partially into the lithium active core, the dusting particles having an average size of less than 5 μm, a negative electrode comprising at least lithium metal, and an electrolyte. A first example of the lithium ion battery further includes wherein the dusting particles are composed of one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and polyacrylonitrile. A second example of the lithium ion battery, optionally including the first example of the lithium ion battery, further includes wherein the dusting particles are greater than 0.1 wt % and less than 5 wt % of the dusted lithium active material. A third example of the lithium ion battery, optionally including one or more of the first and second examples of the lithium ion battery, further includes wherein the lithium active core is NMC, NCA, NCMA, or LFP.

In yet another example, a battery pack comprises a plurality of batteries, each of the plurality of batteries comprising a positive electrode comprising a dusted lithium active material, where the dusted lithium active material includes a lithium active core with dusting particles partially covering a surface of the lithium active core and extending partially into the lithium active core, the dusting particles having an average size of less than 20 μm, a negative electrode comprising at least lithium metal, and an electrolyte.

Although described primarily as to coating positive electrode active materials, it should be appreciated that the flame retardant particles may be used to coat anodes to improve thermal stability and that the description herein may be applied to an anode material as well as to the cathode materials. For example, the flame retardant particles may be coated on an anode material, such as a graphite material, from 0-50% with an improvement as to thermal stability. Similarly, the flame retardant particles may further be used to improve thermal stability by mixing the flame retardant particles in electrolytes to control temperature rise and suppress the electrolyte from flaming.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrode active material for a lithium ion battery, the electrode active material comprising:
a lithiated compound core formed of primary particles packed to form secondary particles, wherein the lithiated compound core includes voids within a surface of the lithiated compound core between primary particles increasing a surface area of the lithiated compound core particle; and
flame-retardant dusting particles partially retained within the voids within the surface of the lithiated compound core, wherein the flame-retardant dusting particles have an average size of less than 20 μm, wherein an amount of the flame-retardant dusting particles by weight is greater than 0.1% of the electrode active material and less than 50% of the electrode active material, and wherein a coverage of the flame-retardant dusting particles on the lithiated compound core is greater than 50% of an increased surface area of the lithiated compound core and less than 90% of the increased surface area of the lithiated compound core.

2. The electrode active material of claim 1, wherein the lithiated compound core is a lithium intercalation compound, a lithium metal oxide, a lithium metal phosphate, or a combination thereof.

3. The electrode active material of claim 1, wherein the lithiated compound core is one of NMC, NCA, NCMA, and LFP.

4. The electrode active material of claim 1, wherein the flame-retardant dusting particles are composed of one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and polyacrylonitrile.

5. The electrode active material of claim 4, wherein the flame-retardant dusting particles are composed of aluminum hydroxide.

6. The electrode active material of claim 1, wherein the electrode active material is included in a cathode.

7. The electrode active material of claim 1, wherein the electrode active material is included in an anode.

8. The electrode active material of claim 1, wherein a height of the flame-retardant dusting particles from the surface of the lithiated compound core varies along the surface of the lithiated compound core.

9. A method for manufacturing an electrode active material, the method comprising:
preparing each of a core powder comprised of one or more electrochemically active materials and a dusting powder comprised of one or more flame-retardant materials, wherein the core power includes primary particles packed to form secondary particles, and wherein the core powder is in the form of particles having an average size of 0.1 to 20 μm; and
mixing the core powder with greater than 0.1% by weight of the dusting powder and less than 50% by weight of the dusting powder, such that the dusting powder is partially retained within a void between the primary particles of the core powder, and wherein a coverage of the dusting powder on the core powder is greater than 50% of a surface area of the core powder and less than 90% of the surface area of the core powder.

10. The method of claim 9, wherein the core powder is one or more of $LiMeO_2$ and $LiMePO_4$, where Me is one or more elements selected from Ni, Mn, Co, Al, Mg, Y, Nd, B, Ca, V, Fe, Ga, Nb, Cr, Mo, W, Tc, Ru, Rh, Ir, Pd, Cu, Ge, Si, In, Ag, Cd, and Zn.

11. The method of claim 9, wherein the core powder is NMC, NCA, NCMA, or LFP.

12. The method of claim 9, wherein the one or more flame-retardant materials include one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and polyacrylonitrile.

13. The method of claim 9, wherein the mixing is a dry mixing.

14. The method of claim 9, wherein the mixing is a wet mixing.

15. A lithium ion battery, comprising:
a positive electrode comprising:
a dusted lithium active material, wherein the dusted lithium active material includes a lithium active core formed of primary particles packed to form secondary particles with dusting particles partially covering a surface of the lithium active core and extending partially into voids between primary particles of the lithium active core, the dusting particles having an average size of less than 5 μm, wherein the lithium active core is in the form of particles having an average size of at least 10 μm and at most 20 μm, and wherein a coverage of the dusting particles on the lithium active core is greater than 50% of a surface area of the lithiated compound core and less than 90% of the surface area of the lithiated compound core;
a negative electrode comprising at least lithium metal; and
an electrolyte.

16. The lithium ion battery of claim 15, wherein the dusting particles are composed of one or more of zinc borate, magnesium hydroxide, magnesium oxide, magnesium carbonate, magnesium hydrogen carbonate, aluminum hydroxide, aluminum oxide, aluminum hydroxide oxide, antimony oxide, ammonium sulfate, ammonium carbonate, urea, and polyacrylonitrile.

17. The lithium ion battery of claim 15, wherein the dusting particles are greater than 0.1 wt % of the dusted lithium active material and less than 5 wt % of the dusted lithium active material.

18. The lithium ion battery of claim 15, wherein the lithium active core is NMC, NCA, NCMA, or LFP.

* * * * *